US010547788B2

(12) United States Patent
Park et al.

(10) Patent No.: US 10,547,788 B2
(45) Date of Patent: Jan. 28, 2020

(54) ELECTRONIC DEVICE INCLUDING CAMERA AND ACOUSTIC COMPONENT WITH LIMITED INTERFERENCE THEREBETWEEN

(71) Applicant: Samsung Electronics Co., Ltd., Gyeonggi-do (KR)

(72) Inventors: Young-Bae Park, Seoul (KR); Joon-Rae Cho, Seoul (KR); Hyun-Ho Yu, Seoul (KR); Han-Bom Park, Gyeonggi-do (KR); Byoung-Uk Yoon, Gyeonggi-do (KR); Kyung-Hee Lee, Seoul (KR); Ho-Chul Hwang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/810,667

(22) Filed: Nov. 13, 2017

(65) Prior Publication Data

US 2018/0139389 A1 May 17, 2018

(30) Foreign Application Priority Data

Nov. 11, 2016 (KR) .................. 10-2016-0150647

(51) Int. Cl.
*H04N 5/225* (2006.01)
*H04N 5/232* (2006.01)
(Continued)

(52) U.S. Cl.
CPC .......... *H04N 5/23287* (2013.01); *G02B 7/10* (2013.01); *G02B 27/646* (2013.01);
(Continued)

(58) Field of Classification Search
CPC ....................................................... H04R 1/00
See application file for complete search history.

(56) References Cited

U.S. PATENT DOCUMENTS 7,729,066 B2\* 6/2010 Huang .................. G02B 7/08
359/819
2005/0128322 A1 6/2005 Eaton et al.
2010/0110283 A1 5/2010 Shin

FOREIGN PATENT DOCUMENTS

JP 2013-254184 12/2013
WO WO 2008/018007 2/2008

OTHER PUBLICATIONS

European Search Report dated Feb. 7, 2018 issued in counterpart application No. 17200856.7-1208, 9 pages.

\* cited by examiner

*Primary Examiner* — Gary C Vieaux
(74) *Attorney, Agent, or Firm* — The Farrell Law Firm, P.C.

(57) ABSTRACT

An electronic device includes a housing having a first face that faces a first direction and a second face that faces a second direction which is opposite the first face, in which the first face is formed to have an at least partially transparent portion and at least one opening formed adjacent to the at least partially transparent portion; a camera located within the housing and including an image sensor that faces the first direction through the at least partially transparent portion in the housing; an acoustic component structure including a space that is at least partially formed between the camera and the second face of the housing and connected to the at least one opening, and at least one vibrating structure that is located in the space and is movable in the first direction or the second direction to generate sound; a circuit that is located within the housing and is electrically connected to the acoustic component structure to provide a sound-associated signal to the acoustic component structure; and a processor located within the housing and electrically con- (Continued)

nected to the camera, the acoustic component structure, the circuit, and the display.

25 Claims, 19 Drawing Sheets

(51) Int. Cl.
*G02B 7/10* (2006.01)
*G02B 27/64* (2006.01)
*H04R 1/02* (2006.01)
(52) U.S. Cl.
CPC ......... *H04N 5/2252* (2013.01); *H04N 5/2254* (2013.01); *H04N 5/23212* (2013.01); *H04N 5/23293* (2013.01); *H04R 1/028* (2013.01); *H04R 2499/11* (2013.01)

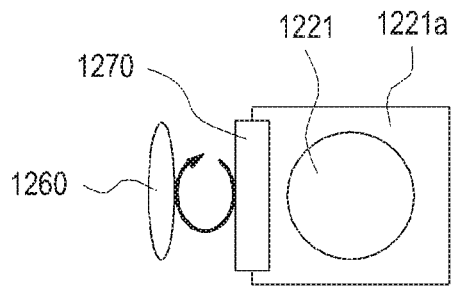
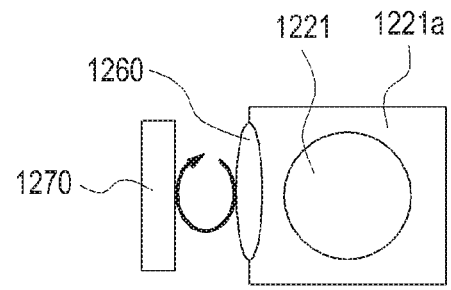
FIG.14A  FIG.14B
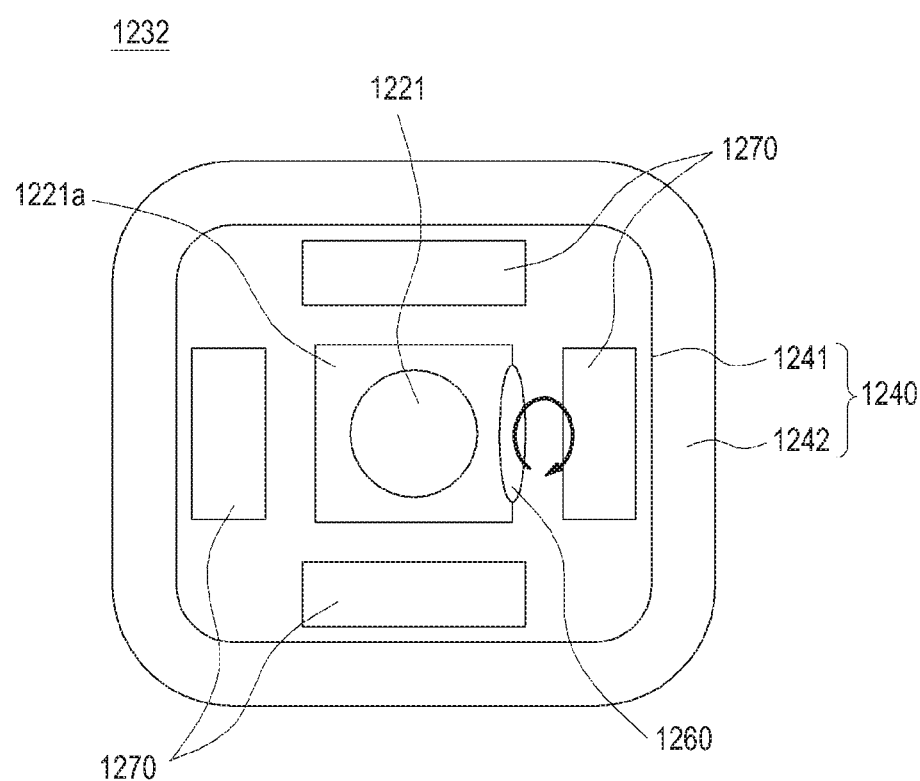
FIG.15

ELECTRONIC DEVICE INCLUDING CAMERA AND ACOUSTIC COMPONENT WITH LIMITED INTERFERENCE THEREBETWEEN

PRIORITY

This application claims priority under 35 U.S.C. § 119(a) to Korean Patent Application Serial No. 10-2016-0150647, which was filed in the Korean Intellectual Property Office on Nov. 11, 2016, the entire content of which is incorporated herein by reference.

BACKGROUND

1. Field of the Disclosure

The present disclosure relates to an electronic device that includes a camera and an acoustic component.

2. Description of the Related Art

Electronic devices, such as smart phones, have become popular due to the recent development of mobile communication technology, including acoustic components. Compact and lightweight cameras have also emerged recently. An acoustic component and a camera can be mounted on an electronic device body.

In recent years, there has been demand for cameras that have high capacity and high performance. Due to this, cameras having functions similar to those of a digital single lens reflex (DSLR) camera are being actively developed. Functions incorporated in a camera mounted on an electronic device can include an optical image stabilization (OIS) function, an auto focus (AF) function, and a zoom function.

The OIS function is a technique for compensating for the shaking of a subject image due to the vibration of a human body, such as a hand shake of a user, during image capturing. The OIS can be performed by detecting a vibration applied to an electronic device, such as a camera, through a plurality of angular velocity sensors equipped in the electronic device, and moving a lens or an image sensor according to the angular velocity and direction of the detected vibration.

In an electronic device, as a display unit's size is increased, the amount of space for various electronic components is reduced. Holes for transmitting/receiving sounds or capturing an image are formed in the electronic device, and these holes are commonly used by cameras and acoustic components. Thus, the electronic components may be mounted from the holes in the electronic device, which may deteriorate the transmission/reception performance of the acoustic components.

An electronic device, which uses both a camera and an acoustic component structure, requires a mounting space for the camera and the acoustic component structure. However, the available mounting regions for the cameras and the acoustic components are decreasing due to the increase in the sizes of a display and a battery.

When the OIS function and the AF function are added to a camera, magnets for implementing the functions are mounted. Magnets for emitting sound are also mounted on the acoustic components. When a distance between a camera and an acoustic component is short, the magnets of the cameras and the acoustic components may deteriorate the OIS function and the AF function due to leaking magnetic fluxes. When a camera is located at the center of the electronic device, an acoustic component (e.g., the receiver) may deteriorate the acoustic performance. For example, when the camera is disposed at the center of the electronic device, an acoustic component may be disposed away from the center such that the sound generated from the acoustic component cannot be emitted smoothly from the center therefore causing deteriorated acoustic performance.

SUMMARY

According to an aspect of the present disclosure, a device that includes a camera and an acoustic component structure is provided that are integrated in order to solve the problems that closely mounted components can interfere with each other and the decreasing available mounting spots due to increasing display sizes, and increasing battery sizes.

According to an embodiment of the present disclosure, an electronic device includes a housing having a first face that faces a first direction and a second face that faces a second direction which is opposite the first face, the first face being formed to have at least partially transparent portion and at least one opening formed adjacent to the at least partially transparent portion; a camera located within the housing and including an image sensor that faces the first direction through the at least partially transparent portion in the housing; an acoustic component structure including a space that is at least partially formed between the camera and the second face of the housing and connected to the at least one opening, and at least one vibrating structure that is located in the space and is movable in one of the first direction and the second direction to generate sound; a circuit that is located within the housing and is electrically connected to the acoustic component structure to provide a sound associated signal to the acoustic component structure; a display exposed through the first face and positioned adjacent to the camera; and a processor located within the housing and electrically connected to the camera, the acoustic component structure, the circuit, and the display.

According to an embodiment of the present disclosure, a device includes a case; an acoustic component structure included in the case, and including at least one magnet, an acoustic component coil that faces the at least one magnet, and a diaphragm that generates sound using the at least one magnet and the acoustic component coil; a camera included in the case, and including a lens, a substrate including an image sensor, and a drive unit that drives the lens by one of the at least one magnet and a camera coil; and a cover coupled to the case and forming a first opening to which the lens is coupled and at least one second opening through which sound is emitted.

According to an embodiment of the present disclosure, a device includes a case including an opening; a cover coupled to the case; an acoustic component structure included in the case, and including at least one magnet, an acoustic component coil that faces the at least one magnet, and a diaphragm that generates sound using the at least one magnet and the acoustic component coil; and a camera included in the case, and including a lens, a substrate including an image sensor, and a drive unit that drives the lens by the at least one magnet and the camera coil. The opening enables image capturing of the camera and sound emission of the diaphragm.

According to an embodiment of the present disclosure, a device includes a case including a first opening and a first face; a cover coupled to the case and including a second opening and second face; an acoustic component structure included in the case, and including at least one magnet, an acoustic component coil that faces the at least one magnet, and a diaphragm with a front face that generates sound using the at least one magnet and the acoustic component coil; and a camera included in the case, and including a lens, a substrate including an image sensor, and a drive unit that drives the lens by the at least one magnet and the camera coil. The first opening is formed in the front face of the case and may emit sound of the diaphragm to the front face of the case, and the second opening is formed in the rear face of the case, and the lens is coupled through the second opening.

According to an embodiment of the present disclosure, a method of operating an acoustic component structure of an electronic device includes an operation in which, when an operation is executed with the acoustic component structure, one of a transmission/reception mode and a sound reproduction mode of the device is executed; an operation in which a processor included in the device interrupts the supply of current to a camera coil included in a camera, and applies current to an acoustic component coil of the acoustic component structure; and an operation in which a force is generated by the acoustic component coil and at least one magnet included in the acoustic component structure, and a diaphragm is vibrated up and down to generate sound.

According to an embodiment of the present disclosure, a method of operating a camera of a device includes an operation which is executed in a camera mode in the device; an operation in which a processor included in the device interrupts supply of current to an acoustic component coil included in an acoustic component structure and applies current to at least one camera coil of the camera; an operation in which an electromagnetic field is generated by the at least one camera coil and the at least one magnet included in the acoustic component structure, and an OIS drive unit and an AF drive unit using the electromagnetic field to perform at least one of correct the shaking of the camera and adjust a focus of the lens; and an operation in which an image is captured using of the camera.

BRIEF DESCRIPTION OF THE DRAWINGS

The above and other aspects, features, and advantages of the present disclosure will be more apparent from the following detailed description taken in conjunction with the accompanying drawings, in which:

FIG. 14A is a view illustrating the magnet and a coil among the components of the device including the camera and the acoustic component structure according to embodiments of the present disclosure;

FIG. 14B is a view illustrating the magnet and a coil among the components of the device including the camera and the acoustic component structure according to embodiments of the present disclosure;

FIG. 15 is a view illustrating an operating state of an AF drive unit of the camera among the components of the device including the camera and the acoustic component structure according to embodiments of the present disclosure;

DETAILED DESCRIPTION

Figure 1:
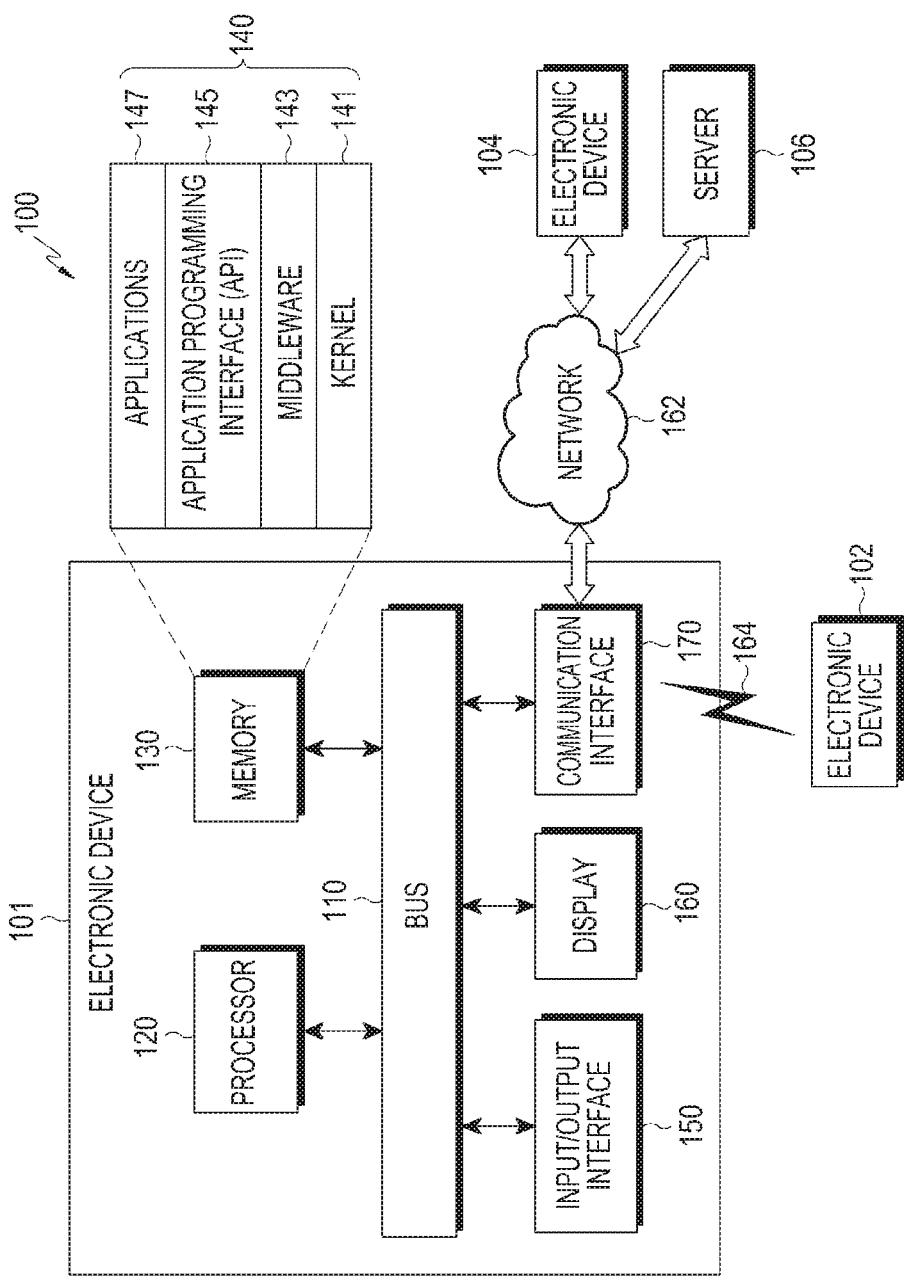
FIG. 1 is a view illustrating a network environment that includes an electronic device according to embodiments of the present disclosure.

The present disclosure has been made to address at least the above-mentioned problems and/or disadvantages and to provide at least the advantages described below. The embodiments and the terms used in the present disclosure are not intended to limit the technology disclosed to specific forms, and should be understood to include modifications, equivalents, and/or alternatives to the corresponding embodiments. In the description of the drawings, similar reference numerals may be used to designate similar elements. As used in the present disclosure, singular forms may include plural forms unless the context clearly indicates otherwise. The expressions "a first", "a second", "the first", or "the second" may modify components regardless of the order and/or the importance but do not limit the corresponding components. When an element (e.g., first element) is referred to as being "(functionally or communicatively) connected," or "directly coupled" to another element (second element), the element may be connected directly to the another element or connected to the another element through yet another element (e.g., third element).

Furthermore, in the present disclosure, the expression "and/or" includes any and all combinations of the associated listed words. For example, the expression "A and/or B" may include A, may include B, or may include both A and B.

The expression "configured to" as used in the present disclosure may be interchangeably used with, for example, "suitable for", "having the capacity to", "designed to", "adapted to", "made to", or "capable of" in terms of hardware or software, according to the circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller machine (ATM), point of sales (POS) device, or Internet of things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. The electronic device is not limited to the above described devices. The term "user" may indicate a person who uses an electronic device or a device (e.g., an artificial intelligence electronic device) that uses an electronic device.

An electronic device 101 within a network environment 100 will be described with reference to FIG. 1. The electronic device 101 may include a bus 110, a processor 120, a memory 130, an input/output interface 150, a display 160, and a communication interface 170. At least one of the above mentioned components may be omitted from the electronic device 101 or other components may be additionally included in the electronic device 101. The bus 110 may include a circuit that interconnects the above mentioned components 110 to 170 and transfers communication information (e.g., a control message or data) among the components 110 to 170. The processor 120 may include one or more of a CPU, an AP, and a communication processor (CP). The processor 120 may execute an arithmetic operation or data processing that is related to a control and/or communication of one or more other components of the electronic device 101.

The memory 130 may include a volatile memory and/or a non-volatile memory. The memory 130 may store commands or data that are related to one or more components of the electronic device 101. The memory 130 may store software and/or a program 140. The program 140 may include kernel 141, middleware 143, an application programming interface (API) 145, and/or applications 147. At least one of the kernel 141, the middleware 143, and the API 145 may be referred to as an operating system (OS). The kernel 141 may control or manage system resources (e.g., the bus 110, the processor 120, or the memory 130) that are used for executing operations or functions implemented in the other programs (e.g., the middleware 143, the API 145, or the applications 147). In addition, the kernel 141 may provide an interface that allows the middleware 143, the API 145, or the applications 147 to access individual components of the electronic device 101 to control or manage the system resources.

The middleware 143 may play an intermediary role such that the API 145 or the applications 147 may communicate with the kernel 141 to exchange data. In addition, the middleware 143 may process one or more task requests which are received from the applications 147 according to the task request's priority. For example, the middleware 143 may assign priority to be capable of using a system resource of the electronic device 101 (e.g., the bus 110, the processor 120, or the memory 130) to at least one of the applications 147, and may process the one or more task requests. The API 145 is an interface that allows the applications 147 to control functions provided from the kernel 141 or the middleware 143, and may include one or more interfaces or functions (e.g., commands) for file control, window control, an image processing, or character control. The input/output interface 150 may transmit commands or data, which are entered from a user or any other external device, to the other component(s) of the electronic device 101, or may output commands or data, which are received from the other component(s) of the electronic device 101, to the user or the other external device.

The display device 160 may include a liquid crystal display (LCD), a light emitting diode (LED) display, an organic light emitting diode (OLED) display, a microelectromechanical system (MEMS), or an electronic paper display. The display 160 may display various contents (e.g., text, image, video, icon, or symbol) to the user. The display 160 may include a touch screen, and may receive a touch input, a gesture input, a proximity input, or a hovering input that is made using an electronic pen or a part of the user's body. The communication interface 170 may set communication between the electronic device 101 and an external device (e.g., a first external electronic device 102, a second external device 104, or a server 106). For example, the communication interface 170 may be connected with a network 162 through wired or wireless communication to communicate with the external device.

The wireless communication may include a cellular communication that uses at least one of long-term evolution (LTE), LTE advance (LTE-A), code division multiple access (CDMA), wideband CDMA (WCDMA), universal mobile telecommunication system (UMTS), wireless broadband (WiBro), and global system for mobile communication (GSM). According to an embodiment, the wireless communication may include at least one of wireless fidelity (WiFi), Bluetooth °, Bluetooth Low Energy (BLE), ZigBee, near field communication (NFC), magnetic secure transmission (MST), radio frequency (RF), and body area network (BAN). The wireless communication may include GNSS. The GNSS may include at least one of global positioning system (GPS), global navigation satellite system (Glonass), Beidou navigation satellite system (Beidou), and Galileo, the European global satellite-based navigation system, according to a use area or bandwidth. In the present disclosure, "GPS" may be interchangeably used with "GNSS". The wired communication may use at least one of universal serial bus (USB), high definition multimedia interface (HDMI), recommended standard 232 (RS-232), and plain old telephone service (POTS). The network 162 may include a telecommunication network (e.g., at least one of a computer network (e.g., LAN or WAN), the Internet, and a telephone network).

The first and second external electronic devices 102 and 104 may be the same type device as or different from the electronic device 101. All or some of the operations to be executed by the electronic device 101 may be executed in another electronic device or a plurality of other electronic devices (e.g., the electronic devices 102 and 104, or the server 106). In the case where the electronic device 101 should perform a certain function or service automatically, or in response to a request, the electronic device 101 may request some functions or services that are associated with the other electronic devices, instead of, or in addition to, executing the functions or service by itself. The other electronic devices may execute the requested functions or additional functions, and may deliver the results to the electronic device 101. The electronic device 101 may provide the requested functions or services by processing the received results as they are or perform additional processing. For this purpose a cloud computing technique, a distributed computing technique, or a client-server computing technique may be used.

Figure 2:
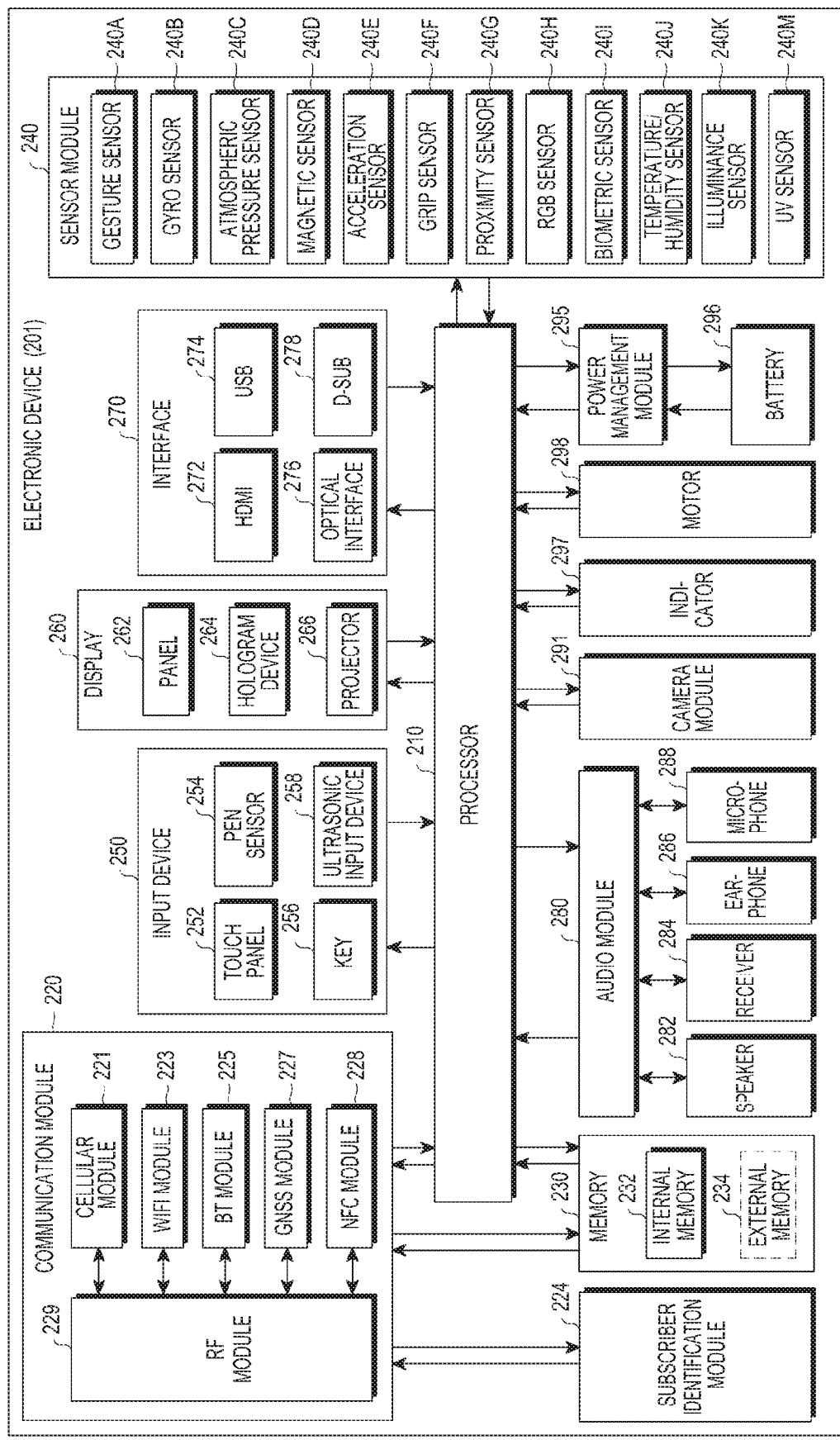
FIG. 2 is a block diagram of an electronic device according to embodiments of the present disclosure.

FIG. 2 is a block diagram of an electronic device 201. The electronic device 201 may include the entire or a portion of the electronic device 101 illustrated in FIG. 1. The electronic device 201 may include at least one processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may drive an OS or an application to control a plurality of connected hardware or software components, and may also perform data processing and arithmetic operations. The processor 210 may be implemented by a system-on-chip (SoC). The processor 210 may further include a graphic processing unit (GPU) and/or an image signal processor. The processor 210 may include at least some components (e.g., a cellular module 221) among the components illustrated in FIG. 2. The processor 210 may load a command and data received from at least one of the other components (e.g., a non-volatile memory) in a volatile memory to process the command and data, and may store resultant data in a non-volatile memory.

The communication module 220 may have a configuration that is the same as or similar to that of the communication interface 170. The communication module 220 may include a cellular module 221, a WiFi module 223, a Bluetooth module 225, a GNSS module 227, an NFC module 228, and an RF module 229. The cellular module 221 may provide a voice call, a video call, a message service, or Internet service through a communication network. The cellular module 221 may perform discrimination and authentication of the electronic device 201 within the communication network using the SIM (e.g., a SIM card) 224. The cellular module 221 may perform at least some of the multimedia control functions that may be provided by the processor 210. The cellular module 221 may include a CP. At least some (e.g., two or more) of the cellular module 221, the WiFi module 223, the Bluetooth module 225, the GNSS module 227, and the NFC module 228 may be incorporated in a single integrated circuit (IC) or an IC package. The RF module 229 may transmit/receive a communication signal (e.g., an RF signal). The RF module 229 may include a transceiver, a power amp module (PAM), a frequency filter, a low noise amplifier (LNA), or an antenna. At least one of the cellular module 221, the WiFi module 223, the Bluetooth module 225, the GNSS module 227, and the NFC module 228 may transmit/receive an RF signal through one or more separate RF modules. The SIM 224 may include a card that includes a SIM and/or an embedded SIM, and may also include intrinsic identification information (e.g., integrated circuit card identifier (ICCID)) or subscriber information (e.g., international mobile subscriber identity (IMSI)).

The memory 230 (e.g., the memory 130) may include an internal memory 232 or an external memory 234. The internal memory 232 may include at least one of a volatile memory (e.g., a DRAM, an SRAM, or an SDRAM), a non-volatile memory (e.g., an one time programmable ROM (OTPROM), a PROM, an EPROM, an EEPROM, a mask ROM, a flash ROM, a flash memory, a hard drive, and a solid state drive (SSD). The external memory 234 may further include a flash drive (e.g., a compact flash (CF), a secure digital (SD), a micro secure digital (Micro-SD), a mini secure digital (Mini-SD), an extreme digital (xD), a multimedia card (MMC), or a memory stick). The external memory 234 may be functionally or physically connected to the electronic device 201 through various interfaces.

The sensor module 240 may measure a physical quantity or may sense an operating status of the electronic device 201, and may then convert the measured or sensed information into electric signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a biometric sensor 240I, a temperature/humidity sensor 240J, an illuminance sensor 240K, and an ultra-violet (UV) sensor 240M. Additionally, or alternatively, the sensor module 240 may include an e-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 may further include a control circuit for controlling one or more sensors incorporated therein. The electronic device 201 may further include a processor configured to control the sensor module 240 as a part of the processor 210 or separate from the processor 210 to control the sensor module 240 while the processor 210 is in the sleep state.

The input device 250 may include a touch panel 252, a (digital) pen sensor 254, a key 256, or an ultrasonic input device 258. With the touch panel 252, at least one of a capacitive type touch panel, a resistive type touch panel, an infrared type touch panel, and an ultrasonic type panel may be used. Also, the touch panel 252 may further include a control circuit. The touch panel 252 may further include a tactile layer to provide a tactile reaction to the user. The (digital) pen sensor 254 may be a portion of the touch panel, or may include a separate recognition sheet. The key 256 may include a physical button, an optical key, or a keypad. The ultrasonic input device 258 may sense, through a microphone 288, ultrasonic waves generated by an input tool to confirm data corresponding to the sensed ultrasonic waves.

The display 260 (e.g., the display 160) may include a panel 262, a hologram device 264, a projector 266, and/or a control circuit for controlling these components. The panel 262 may be implemented to be flexible, transparent, or wearable. The panel 262 may be integrated with the touch panel 252 and one or more modules. The panel 262 may include a pressure sensor (or a force sensor) that is capable of measuring the intensity of a pressure of a user's touch. The pressure sensor may be integrated with the touch panel 252, or implemented by one or more sensors separately from the touch panel 252. The hologram device 264 may show a stereoscopic image in the air using interference of light. The projector 266 may project light onto a screen to display an image. The screen may be located inside or outside the electronic device 201. The interface 270 may include an HDMI 272, a USB 274, an optical interface 276, or a D-subminiature (D-sub) 278. For example, the interface 270 may be included in the communication interface 170 illustrated in FIG. 1. Additionally, or alternatively, the interface 270 may include a mobile high-definition link (MHL) interface, an SD card/multi-media card (MMC) interface, or an Infrared Data Association (IrDA) standard interface.

The audio module 280 may bi-directionally convert sound and electric signals. At least some of the components of the audio module 280 may be included in the input/output interface 150 illustrated in FIG. 1. The audio module 280 may process sound information input or output through a speaker 282, a receiver 284, an earphone 286, or the microphone 288. The camera module 291 is capable of capturing an image, for example, a still image and a video image, and the camera module 291 may include at least one image sensor (e.g., a front sensor or a rear sensor), a lens, an image signal processor (ISP), or a flash (e.g., LED or xenon lamp). The power management module 295 may manage the electric power of the electronic device 201. The power management module 295 may include a power management integrated circuit (PMIC), a charger IC, or a battery gauge. The PMIC may be configured as a wired and/or wireless charge type. The wireless charging type may include a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include a rechargeable battery and/or a solar battery.

The indicator 297 may indicate a specific status (e.g., a booting status, a message status, or a charged status) of the electronic device 201 or of a part thereof (e.g., the processor 210). The motor 298 may convert an electric signal into a mechanical vibration, and may generate a vibration or a haptic effect. The electronic device 201 may include a mobile TV support device (e.g., a GPU) that is capable of processing media data according to a standard of, for example, digital multimedia broadcasting (DMB), digital video broadcasting (DVB), or MediaFlo™. Each of the components described herein may be constituted with one or more components, and the names of the corresponding components may vary depending on a type of an electronic device. An electronic device (e.g., the electronic device 201) may not include some of the components, or may include additional components. Alternatively, some of the components may be combined with each other to be configured as one object, and to perform the functions of the corresponding components prior to the combination.

Figure 3:
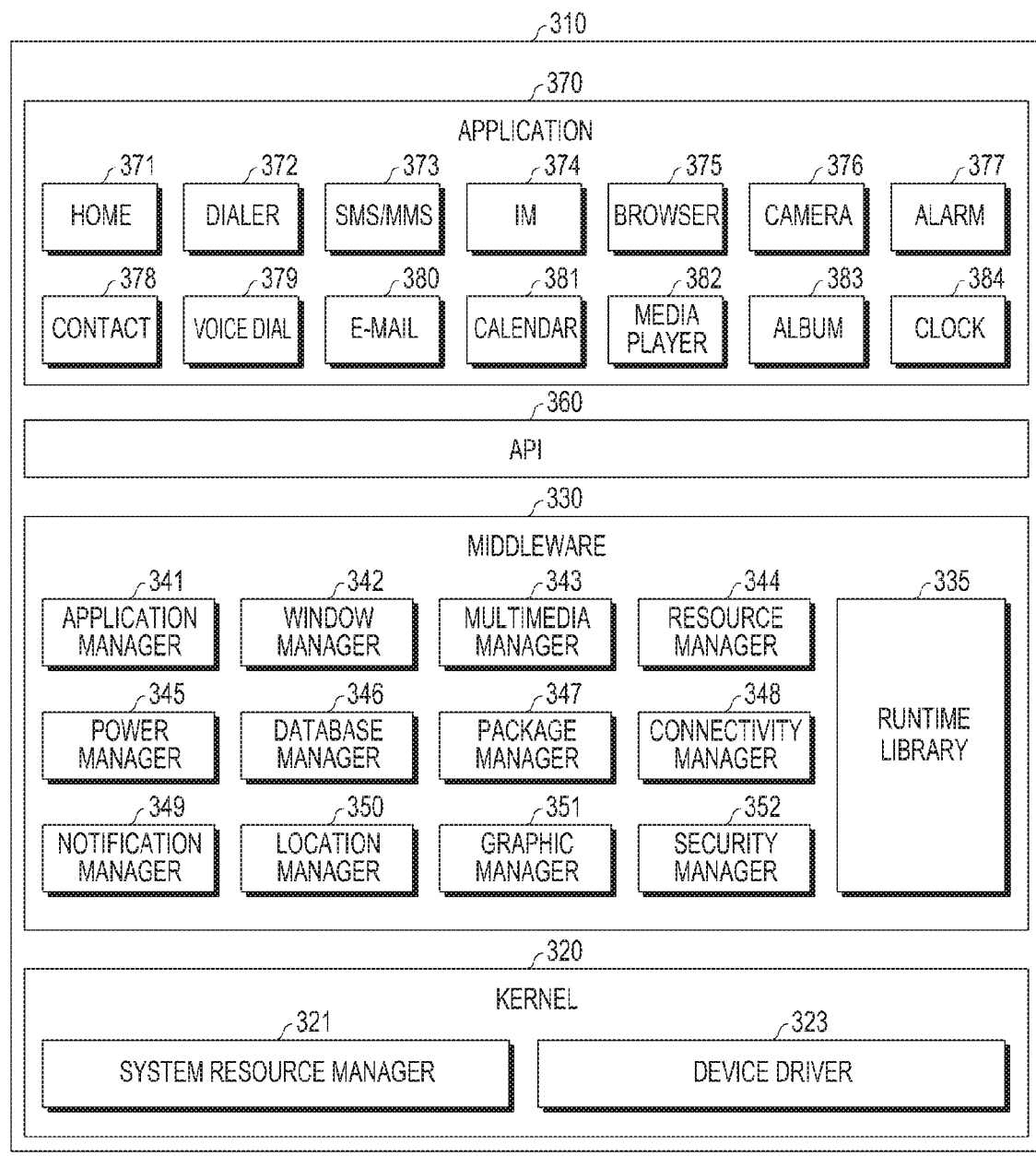
FIG. 3 is a block diagram of a program module according to embodiments of the present disclosure.

FIG. 3 is a block diagram illustrating a program module. A program module 310 (e.g., the program 140) may include an OS that controls resources associated with an electronic device and/or various applications (e.g., the applications 147) that are driven on the OS. The OS may include Android™, iOS™, Windows™, Symbian™, Tizen™, or Bada™. Referring to FIG. 3, the program module 310 may include a kernel 320, a middleware 330, an API 360, and/or an application 370. At least a portion of the program module 310 may be preloaded on the electronic device, or may be downloaded from an external electronic device 102 or 104, or the server 106.

The kernel 320 may include a system resource manager 321 and/or a device driver 323. The system resource manager 321 may perform a control, allocation, or recovery of a system resource. The system resource manager 321 may include a process management unit, a memory management unit, or a file system management unit. The device driver 323 may include a display driver, a camera driver, a Bluetooth driver, a common memory driver, a USB driver, a keypad driver, a WiFi driver, an audio driver, or an inter-process communication (IPC) driver. The middleware 330 may provide a function that is commonly required by the applications 370, or may provide various functions to the applications 370 through the API 360 such that the applications 370 can efficiently use the limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manger 350, a graphic manager 351, and a security manager 352.

The runtime library 335 may include a library module that is used by a compiler to add a new function through a program language while the applications 370 are executed. The runtime library 335 may perform input/output management, memory management, or processing of an arithmetic function. The application manager 341 may manage a life cycle of the applications 370. The window manager 342 may manage a GUI resource. The multimedia manager 343 may be aware of a format required for reproducing various media files, and may perform encoding or decoding of the media files using a suitable codec. The resource manager 344 may manage source code of the applications 370 or a memory space. The power manager 345 may manager a battery capacity or power, and may provide power information to the electronic device 201. The power manager 345 may be interlocked with a basic input/output system (BIOS). The database manager 346 may generate, retrieve, or change a database used by the applications 370. The package manager 347 may manage the installation or update of an application that is distributed in the form of a package file.

The connectivity manager 348 may manage a wireless connection. The notification manager 349 may provide events such as a arrival massage, a promise, or a proximity notification to the user. The location manager 350 may manage the position information of the electronic device. The graphic manager 351 may manage a graphic effect to be provided to the user or a user interface associated with the electronic device 201. The security manager 352 may provide system security or user authentication. The middleware 330 may include a telephony manager that manages a voice or video call function of the electronic device. The middleware 330 may combine the above described functions. The middleware 330 may provide a module that is specialized for each kind of OS. In addition, the middleware 330 may dynamically delete some of the existing components or add new components. The API 360 is a collection of API programming functions, and may be provided in different configurations depending on the OS. For example, in the case of Android™ or iOS™, one API set may be provided for each platform, and in the case of Tizen™, two or more API sets may be provided for each platform.

The applications 370 may include one or more applications for providing a home 371, a dialer 372, an SMS/MMS 373, an Instant Message (IM) 374, a browser 375, a camera 376, an alarm 377, a contact 378, a voice dial 379, an e-mail 380, a calendar 381, a media player 382, an album 383, and a clock 384, health care information (e.g., measurement of a quantity of a user's motion, or blood sugar level), or environmental information (e.g., atmospheric pressure, humidity, or temperature information). The applications 370 may include an information exchange application that may support information exchange between the electronic device and an external electronic device. The information exchange application may include a notification relay application to transmit specific information to the external electronic devices, or a device management application to manage the external electronic devices. The notification relay application may relay notification information generated by another application, or may receive notification from an external electronic device and may provide the notification information to the user. The device management application may install, delete, or update a function of an external electronic device that communicates with the electronic device (e.g., turn-on/turn-off of the external electronic device itself (or some components thereof) or adjustment of brightness (or resolution) of a display), or an application operated in the external electronic device. The applications 370 may include an application designated according to an attribute of an external electronic device (e.g., a healthcare application for a mobile medical device). The applications 370 may include an application received from an external electronic device. At least a part of the program module 310 may be implemented (e.g., executed) by software, firmware, hardware (e.g., the processor 210), or a combination of at least two thereof, and may include a module, a program, a routine, a command set, or a process for performing one or more functions.

The term "module" as used in the present disclosure may include a unit consisting of hardware, software, or firmware, and may be used interchangeably with the term "logic", "logical block", "component", "circuit", or the like. The "module" may be an integrated component, or a minimum unit for performing one or more functions or a part thereof. The "module" may be mechanically or electronically implemented and may include an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) may be implemented by an instruction which is stored a computer-readable storage medium (e.g., the memory 130) in the form of a program module. The instruction, when executed by a processor, may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include code which is made by a compiler or code which may be executed by an interpreter. The programming module may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The electronic device 101 may be formed of any one of a wearable device, a notebook computer, a netbook computer, a smart phone, a tablet PC, a Galaxy Tab, an iPad, and a wireless charging device.

The display of the electronic device may be implemented with a minimized bezel region, or may be flexible, convex, or concave. The peripheral portion of the display may be bent such that the screen region may be enlarged in a side portion. A screen region of the display, which is bent and enlarge in a side portion, may be used, or a separate screen may be used on the side portion. The display may include a first viewing area, and second viewing areas included on the other sides of the first viewing area.

The electronic device may include a device in which a camera and an acoustic component structure are integrated. The camera may be a OIS function and an AF function camera, a voice-coil motor (VCM)type camera, and an encoder-type camera. The camera is described with reference to the above mentioned cameras by way of example, but is not limited thereto. For example, if the camera includes a lens driven by a drive unit, the camera is within the scope of the present disclosure. The acoustic component structure may include at least one of a receiver and a speaker. When the acoustic component structure is a sound generating structure other than a receiver or a speaker, the acoustic component structure is within the scope of the present disclosure.

Figure 4:
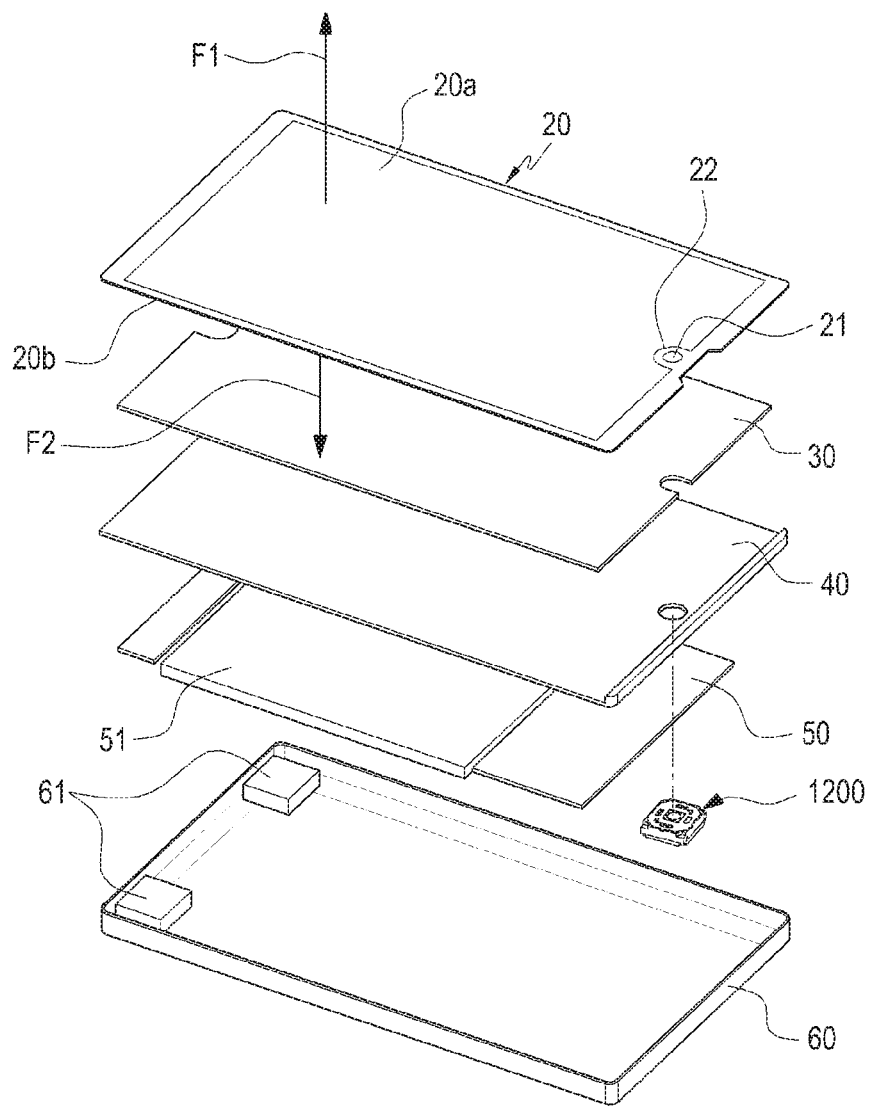
FIG. 4 is an exploded perspective view illustrating a configuration of an electronic device according to embodiments of the present disclosure.

FIG. 4 is an exploded perspective view illustrating a device 1200 including a camera and an acoustic component structure as would be integrated with an electronic device.

The electronic device may include a housing 20, a display panel 30, a support member 40, a printed circuit board 50, a battery pack 51, a rear case 60, and the device 1200.

The support member 40 provides an inner assembly structure that supports a display panel, a printed circuit board (PCB), and the like as an inner housing, and may serve as a structure that secures a connection structure with an outer housing which adds rigidity.

The apparatus 1200 may be located above or below the housing 20 and the support member 40. A transparent portion 21 may be formed on the housing 20 such that an image can be captured through a lens of the camera included in the device 1200. The transparent portion 21 may be a portion that appears opaque but can transmit light through. At least one sound hole 22 may be formed in the housing 20 to radiate the sound of the acoustic component structure of the device 1200 to outside of the electronic device 201.

The housing 20 includes a first face 20a facing a first direction F1 and a second face 20b facing a second direction F2 that is opposite to the first face 20a, and the first surface 20a may include an at least partially transparent portion 21 and at least one opening 22 formed adjacent to the at least partially transparent portion 21. The housing may include a window that forms at least the partially transparent portion 21 for capturing an image using the camera. At least one opening may include at least one sound hole 22.

Figure 5:
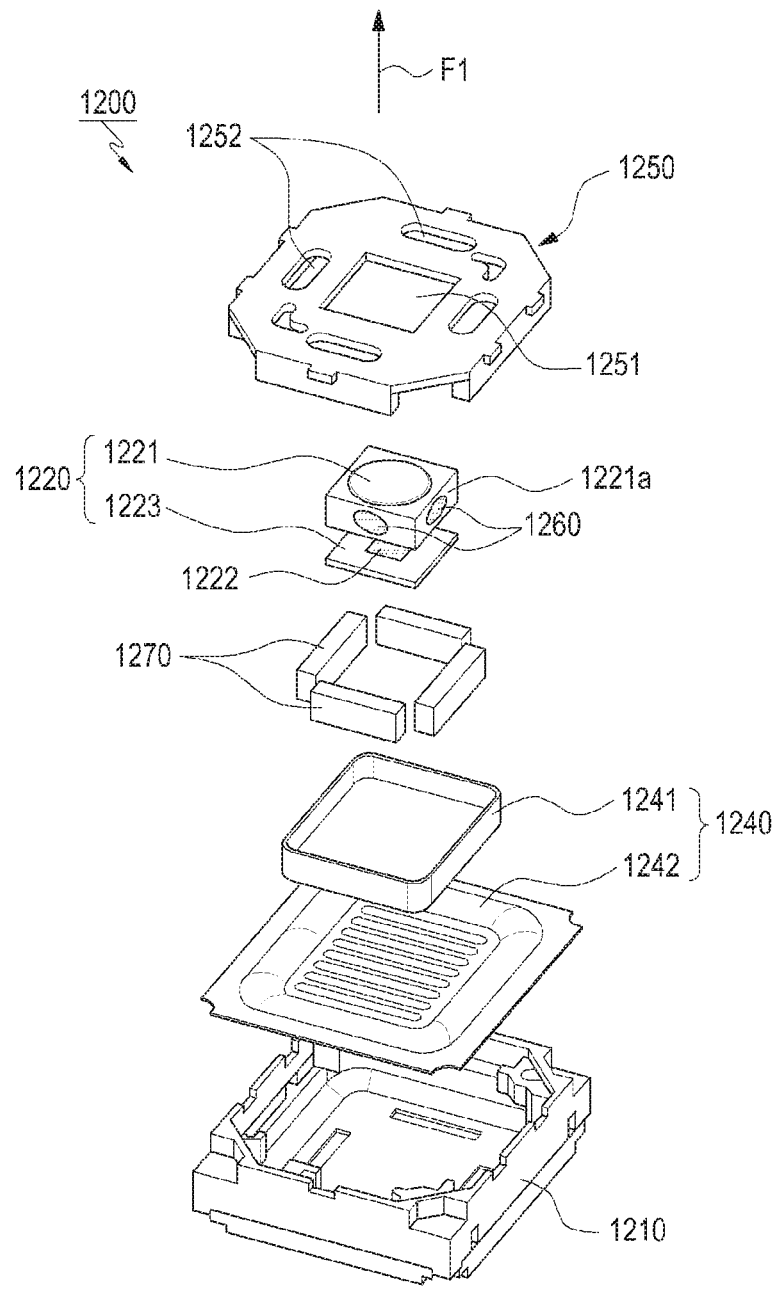
FIG. 5 is an exploded perspective view illustrating a configuration of a device including a camera and an acoustic component structure according to embodiments of the present disclosure.
Figure 6:
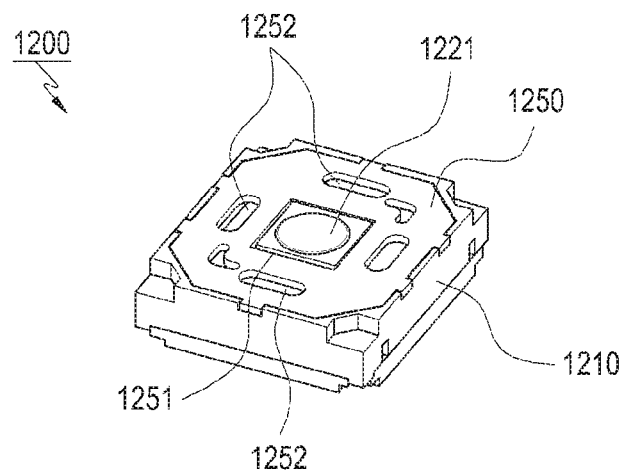
FIG. 6 is an exploded perspective view illustrating an assembled state of the device including the camera and the acoustic component structure according to embodiments of the present disclosure.

FIG. 5 is an exploded perspective view illustrating a configuration of a device 1200 including a camera 1220 and an acoustic component structure 1240. FIG. 6 is an exploded perspective view illustrating an assembled state of the device 1200 including the camera and the acoustic component structure.

Referring to FIGS. 5 and 6, the device 1200 may include a case 1210, a camera 1220, an acoustic component structure 1240, and a cover 1250 including first and second openings 1251 and 1252. The case 1210 may receive the camera 1220 and the acoustic component structure 1240. The case 1210 may include a substrate 1223 including the camera 1220, a lens 1221, and an image sensor 1222; one or more magnets 1270 and one or more coils 1260, which are included in the acoustic component structure 1240; and a drive unit that drives the lens 1221 by the magnets 1270 and the coils 1260. The acoustic component structure 1240 may be included in the rear face of the camera 1220. The acoustic component structure 1240 may include one or more magnets 1270, an acoustic component coil 1241 that faces one or more magnets 1270, or an acoustic component coil 1241 that faces the magnets 1270, and a diaphragm 1242 that generates sound together with the one or more magnets 1270 and the acoustic component coil 1241.

The camera 1220 may include an image sensor 1222 located inside the case 1210 and facing the first direction F1.

The acoustic component structure 1240 may be at least partially formed between the camera 1220 and the second face 20b of the housing 20 (see FIG. 4), and may include a space connected to the second openings 1252 included in the cover 1250. The acoustic component structure 1240 may include at least one vibrating structure that is located in the space and is movable in the first direction F1 (see FIG. 4) or in the second direction F2 to generate sound. At least one vibrating structure may include a first vibrating structure interposed between the camera 1220 and the second face 20b, and a second vibrating structure that encloses at least a portion of the first vibrating structure when viewed from the upper side of the first face 20a. The first vibrating structure may include a diaphragm 1242 that generates sound. The second vibrating structure may include an acoustic component coil 1241 to which current is applied. The vibrating structure is described with reference to the diaphragm and the acoustic component coil 1241 by an example, but is not limited thereto. The vibrating structure may be applied as long as the vibrating structure is configured to generate sound by vibration according to the application of current.

The cover 1250 may be coupled with the case 1210, and may include a first opening 1251 coupled with the lens 1221 and one or more second openings 1252 through which sound is emitted. The first opening 1251 may include a camera hole that exposes the lens 1221 to outside of the electronic device 201 to enable an image to be captured through the lens 1221. The second openings 1252 may include a rear sound emission hole to emit the rear sound of the diaphragm 1242 to the outside.

Inside the housing 20 of the electronic device, a circuit may be electrically connected to the acoustic component structure 1240 to provide a sound associated signal to the acoustic component structure 1240. Inside the housing 20, a processor 120 (see FIG. 1) may be included to be electrically connected to the camera 1220, the acoustic component structure 1240, the circuit, and the display. The display may be exposed through the first face, and may be positioned adjacent to the camera 1220.

The device 1200 may be formed in a rectangular shape, or may be formed in various shapes other than the rectangular shape. For example, the device 1200 may be formed in a cylindrical shape, a rhombus shape, or an elliptical shape.

Figure 7:
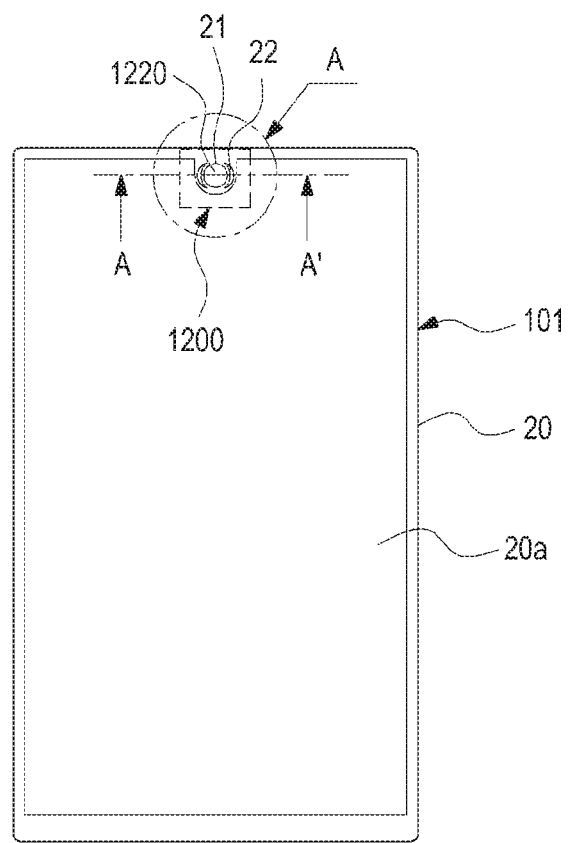
FIG. 7 is a front view illustrating the device including the camera and the acoustic component structure mounted in an electronic device according to embodiments of the present disclosure.
Figure 8:
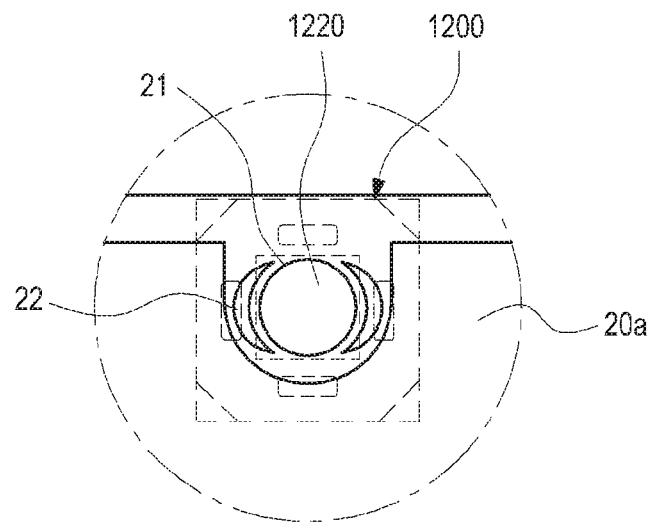
FIG. 8 is an enlarged perspective view of portion A in FIG. 7.

FIG. 7 is a front view illustrating the device 1200 including the camera and the acoustic component structure attached to the electronic device 101. FIG. 8 is an enlarged front view of portion A in FIG. 7.

Referring to FIGS. 6 to 8, the device 1200 may be positioned inside the electronic device 101. For example, the transparent portion 21 and the sound hole 22 of the housing 20 may be positioned such that the first and second openings 1251 and 1252 included in the cover 1250 are aligned with each other. The first opening 1251 of the cover 1250 may be placed to face the transparent portion 21 formed in the first face 20a that faces the first direction F1 of the housing 20, and the second openings 1252 of the cover 1250 may be placed to face the sound hole 22 formed in the first face 20a that faces the first direction F1 of the housing 20.

Figure 9:
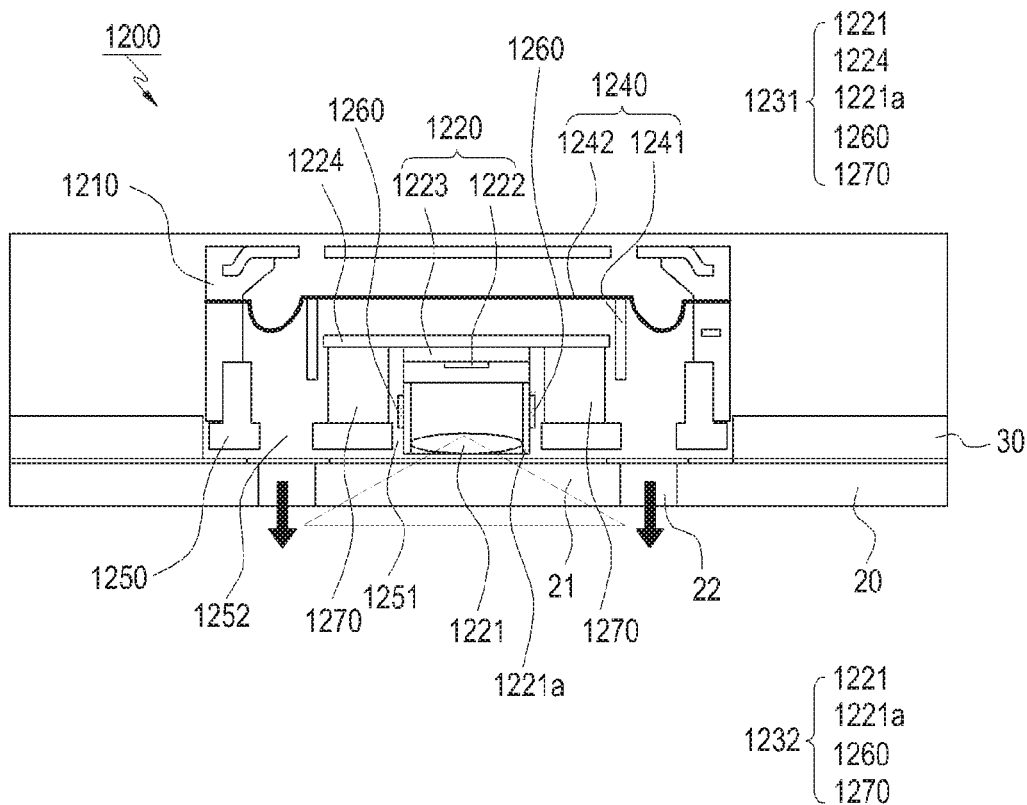
FIG. 9 is a side cross-sectional view illustrating an operating state of the device including the camera and the acoustic component structure according to embodiments of the present disclosure.

FIG. 9 is a side cross-sectional view taken along the line A-A' of FIG. 7, in which the position of an apparatus including a camera and an acoustic component structure, a sound emission direction of the acoustic component structure, and an image capturing direction of the camera are illustrated.

Referring to FIG. 9, the upper face of the camera hole 1251 of the cover 1250 may be positioned to face the lower face of the transparent portion 21 of the housing 20. The rear sound emission hole 1252 of the cover 1250 may be positioned to face the lower face of the sound hole 22 of the housing 20.

In order to operate the acoustic component structure 1240, current may be applied only to the acoustic component coil 1241 and the supply of current to the coil 1260 of the camera 1220 may be interrupted. For example, when current flows only to the acoustic component coil 1241 that is spaced apart from and faces one or more magnets 1270, a Lorentz force is generated by the acoustic component coil 1241 and the magnets 1270, and due to the Lorentz force, the diaphragm 1242 may be vibrated up and down to generate sound. This sound may pass through the rear sound emission hole 1252 of the cover 1250, and may then be emitted to outside the electronic device 201 through the sound hole 22 of the housing 20.

The camera 1220 may capture an image through the transparent portion 21 of the housing 20. The camera 1220 may operate an OIS drive unit 1231 (1221, 1224, 1221a, 1260, 1270) and an AF drive unit 1232 (1221, 1221a, 1260, 1270) to provide a clear image at the time of image capturing. The OIS drive unit 1231 of the camera 1220 is capable of correcting the shaking of the lens 1221 by moving the lens 1221 using an electromagnetic field generated between the coils 1260 and the magnets 1270 of the acoustic component structure 1240 when correcting for the shaking of the lens 1221. When adjusting the focus of the lens 1221, the AF drive unit 1232 of the camera 1220 is capable of adjusting the focus of the lens 1221 by moving the lens 1221 in an optical axis direction using the electromagnetic field generated between the coils 1260 and the magnets 1270 by applying current to the coils 1260.

Figure 10:
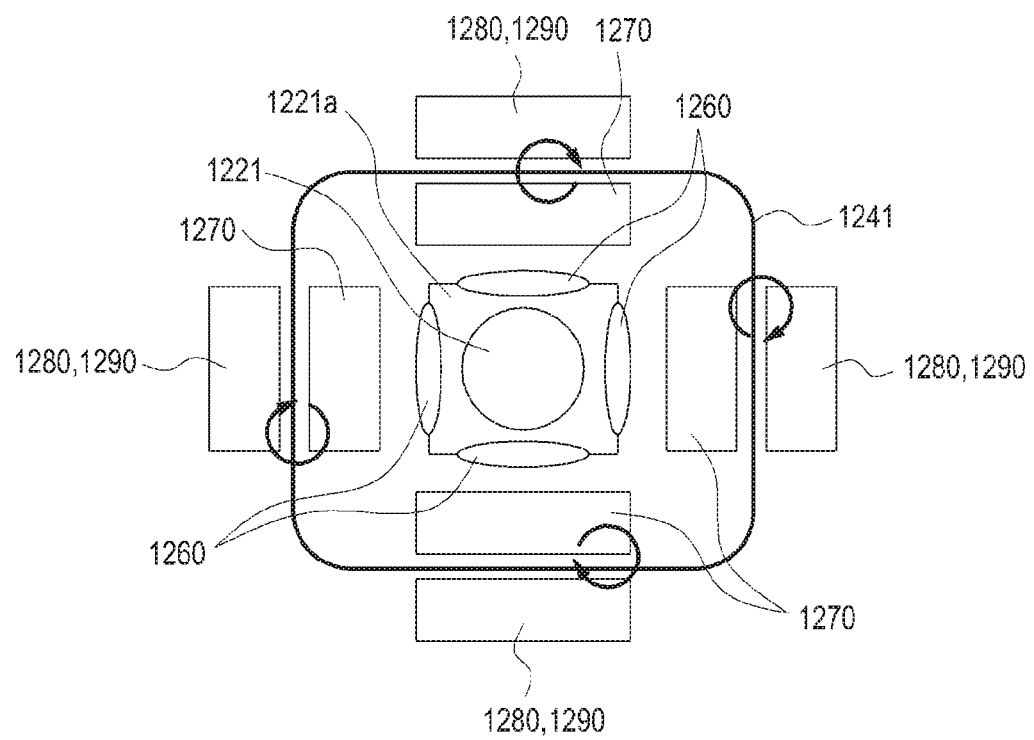
FIG. 10 is a view illustrating an operating state of the acoustic component structure among the components of the device including the camera and the acoustic component structure according to embodiments of the present disclosure.

FIG. 10 is a view illustrating an operating state of the acoustic component structure 1240 among the components of the device 1200 including the camera 1220 and the acoustic component structure 1240.

Referring to FIG. 10, when the acoustic component structure 1240 is executed in a transmission/reception mode or an acoustic listening mode, the processor 120 (see FIG. 1) of the electronic device 101 may apply current only to the acoustic component coil 1241, and may interrupt the supply of current to the coil 1260 of the camera 1220. For example, when current flows only to the acoustic component coil 1241 that faces and is spaced apart from the one or more magnets 1270, a Lorentz force is generated, and the magnitude of the Lorentz force is proportional to the magnitude of the magnetic force (magnetic flux density), the amount of current, or the length of the wound coil 1260. Thus, the direction of the Lorentz force is capable of making the diaphragm 1242 move in a direction perpendicular to a plane formed by the magnetic flux density and the current, e.g., upward or downward. By the above mentioned principle, when the diaphragm 1242 moves upward, a positive (+) sound pressure is generated, and when the diaphragm 1242 moves downward, a negative (−) sound pressure is generated such that sound waves can be emitted. For example, when current flows in the acoustic component coil 1241, a Lorentz force is generated by the acoustic component coil 1241 and the magnets 1270 of the camera 1220, and due to the Lorentz force, the diaphragm 1242 can be vibrated up and down to produce sound.

The acoustic component structure 1240 may utilize one or more magnets 1270 in order to radiate sound. For example, the magnets 1270 of the acoustic component structure 1240 may be used in common with the camera 1220.

Figure 11:
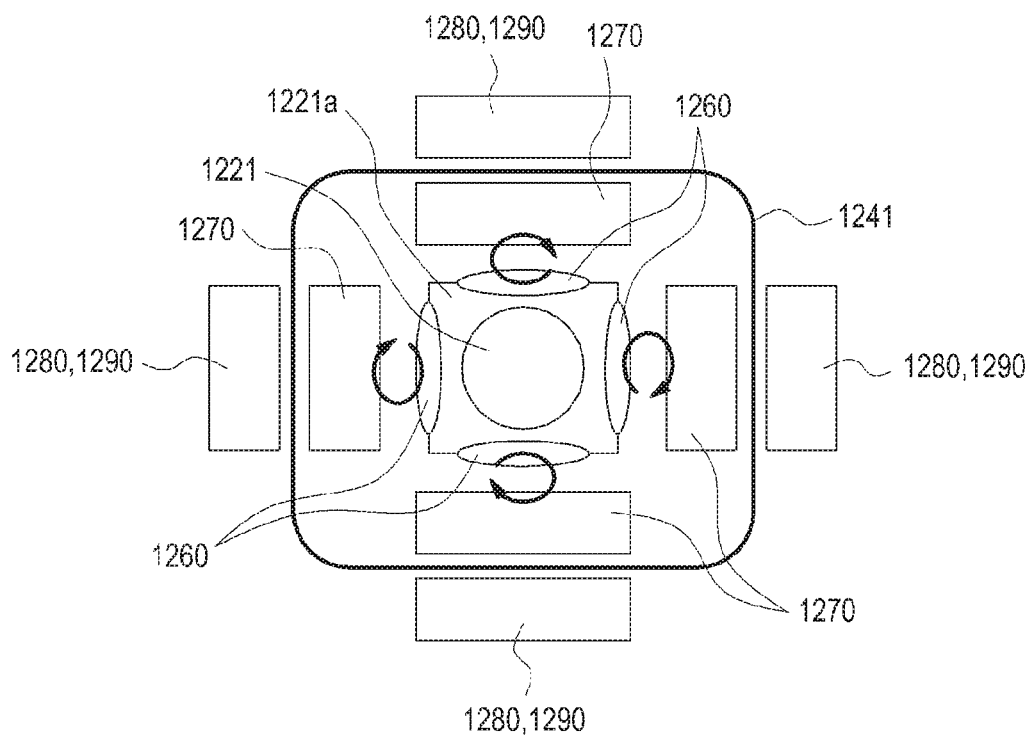
FIG. 11 is a view illustrating an operating state of the camera among the components of the device including the camera and the acoustic component structure according to embodiments of the present disclosure.

FIG. 11 is a view illustrating an operating state of the camera among the components of the device 1200 including the camera 1220 and the acoustic component structure 1240.

Referring to FIG. 11, the driving of the camera 1220 is performed using the shared magnets 1270. As described above with reference to FIG. 9, the drive unit of the camera 1220 includes the OIS drive unit 1231 and an AF drive unit 1232. The OIS drive unit 1231 is capable of correcting the shaking state of the lens 1221. The AF drive unit 1232 is capable of adjusting the focus of the lens 1221 by moving the lens 1221 along the optical axis of the lens 1221.

In the camera 1220, one or more magnets are disposed to face and to be spaced apart from one or more coils disposed in the lens housing 1221a, so that the one or more coils and the one or more magnets may be used as an AF drive unit to adjust the focus of the lens 1221. For example, in the camera 1220, a plurality of coils 1260 may be disposed along the first, second, third, and fourth faces of the lens housing 1221a, and a plurality of magnets 1270 may be disposed to face the plurality of coils 1260. The plurality of coils 1260 and the plurality of magnets 1270 arranged as described above may be used as the AF drive unit 1231 of the camera 1220.

The OIS drive unit 1231 may be included on a base plate 1224. The OIS drive unit 1231 may include the lens 1221, the lens housing 1221a disposed to be spaced apart from an image sensor 1222 included in a substrate 1223, the one or more coils 1260 disposed around the outer periphery of the lens housing 1221a, and the one or more magnets 1270 disposed to face and to be spaced apart from the one or more coils 1260. For example, the base plate 1224 is provided with a substrate 1223 including an image sensor 1222, and the substrate 1223 may be disposed to be spaced apart from the lens housing 1221a in order to cause the image sensor 1222 and the lens 1221 to be spaced apart from each other.

In the case where the cameras are included in the acoustic component structure and no magnet is included in the camera, the magnets may be used in common to operate the acoustic component structure and the camera. Additionally, in the case where the camera includes the magnets and no magnet is included in the acoustic component structure, the magnets may be commonly used to operate the acoustic component structure and the camera.

When current is applied to the coils 1260 for correcting the shaking of the lens 1221, the OIS drive unit 1231 can correct the shaking of the lens 1221 by moving the lens 1221 using an electromagnetic field generated between the coils 1260 and the magnets 1270 of the acoustic component structure 1240.

The AF drive unit 1232 may have a configuration that is the same as or similar to that of the OIS drive unit 1231. When current is applied to the coils 1260 at the time of adjusting the focus of the lens 1221, the focus of the lens 1221 can be adjusted by moving the lens 1221 in an optical axis direction using the electromagnetic field generated between the coils 1260 and the magnets 1270 by applying current to the coils 1260.

Figure 12:
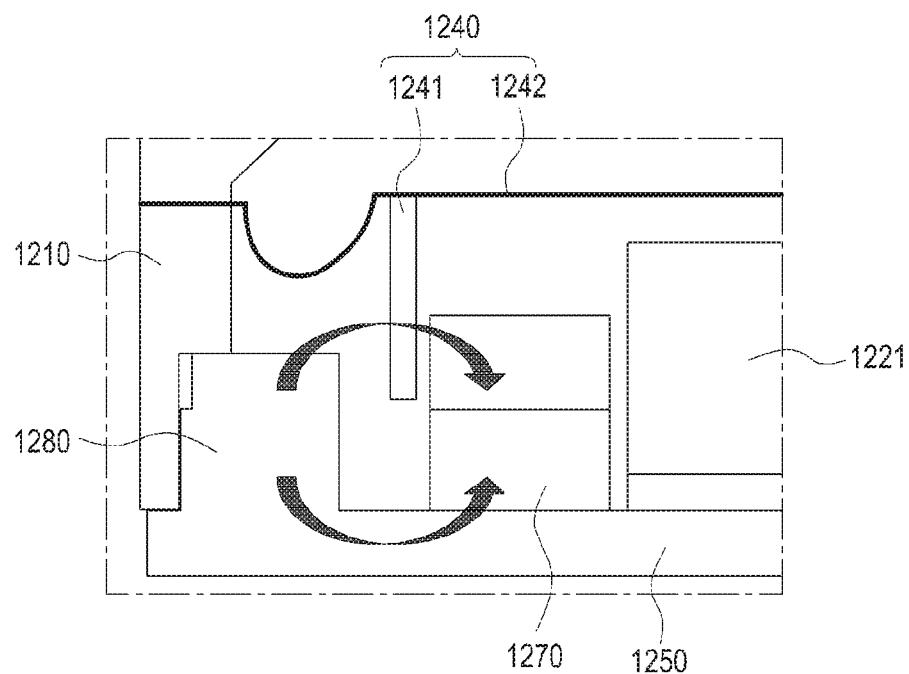
FIG. 12 is a view illustrating an operating state of a magnet and a yoke among the components of the device including the camera and the acoustic component structure according to embodiments of the present disclosure.

As illustrated in FIG. 12, in order to set the initial position before the lens 1221 is driven, at least one yoke 1280 and the one or more magnets 1270 included in the acoustic component structure 1240 may be placed to face each other, and the lens 1221 of the camera 1220 may be positioned at the central portion in the optical axis direction. The lens 1221 may be positioned at the central portion in the optical axis direction by the magnetic force of the magnets 1270 by placing the side faces of the magnets 1270 of the camera 1220 and the yoke 1280 of the cover 1250 to face each other. The lens 1221 can be driven by the OIS drive unit 1231 (illustrated in FIG. 9) to correct the shaking and the focus of the lens 1221 can be adjusted by the AF drive unit 1232 (see FIG. 9).

At least one yoke 1280 may be magnetic to improve acoustic performance. For example, it is possible to improve the acoustic performance of the acoustic component structure 1240 by disposing the magnets 1270 of the acoustic component structure 1240 and the magnetic yoke structure 1270*a* of the cover 1250.

Figure 13:
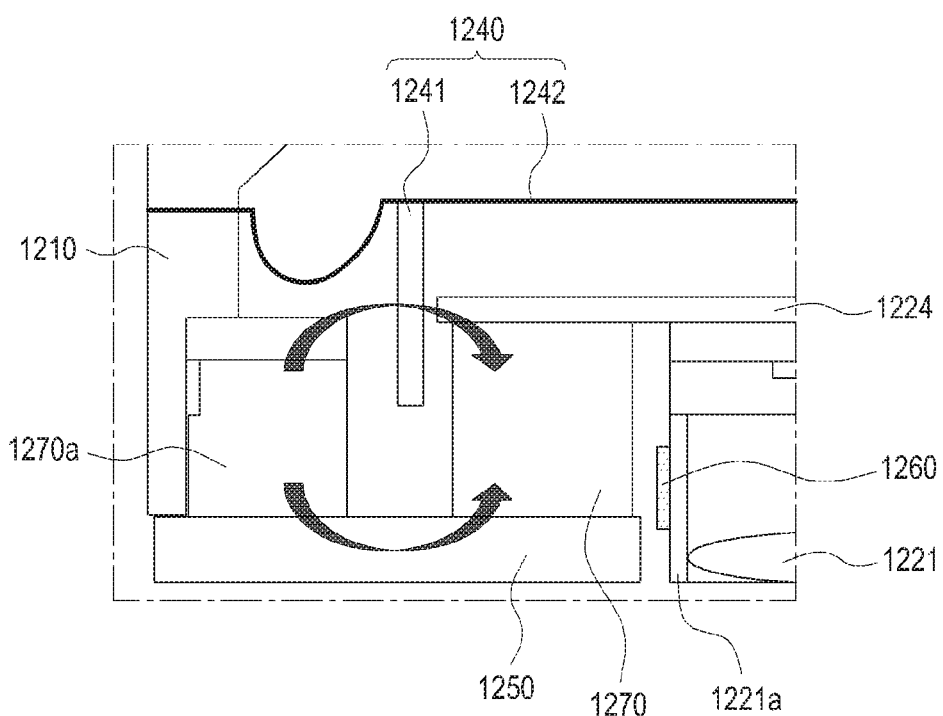
FIG. 13 is a view illustrating a magnet and an operating state of the magnet among the components of the device including the camera and the acoustic component structure according to embodiments of the present disclosure.

As illustrated in FIG. 13, the cover 1250 may include the magnetic yoke structure 1270*a* instead of the yoke 1280. For example, in order to set the initial position of the lens 1221, the magnetic yoke structure 1270*a* may be included in the cover 1250 instead of the yoke 1280 (see FIG. 12) to face the magnets 1270 of the lens 1221. The lens 1221 may be positioned at the central portion in the optical axis direction, which is the initial position of the lens 1221, by the magnetic force of the one or more magnets 1270, or the lens may be positioned at the central portion in the optical axis direction, which is the initial position of the lens 1221, by the magnetic force of the magnets 1270 and the magnetic yoke structure 1270*a*.

When the device 1200 executes the camera 1220 mode, the processor 120 of the electronic device 101 may apply current only to the coils 1260 of the camera 1220, and may interrupt the supply of current to the acoustic component coil 1241. The processor 120 of the electronic device 101 controls the OIS drive unit 1231 to correct the shaking of the lens 1221 by moving the lens 1221. At the time of executing the camera 1220 mode, the processor 120 of the electronic device 101 may emit an image capturing sound and video call sound through another acoustic component structure 61 (see FIG. 4) included in the device 1200. For example, the another acoustic component structure may include a speaker 61 (see FIG. 4).

The device 1200 may detect the drive position of the lens 1221 by the shake correction side position detection sensor unit. The cover 1250 may include a yoke. The cover 1250 may return the lens 1221 to the initial position again by the magnetic force of the magnets 1270 that face the magnetic yoke structure 1270*a* positioned on the upper face of the cover 1250. For example, after the lens 1221 is driven, the lens 1221 may be returned to the central portion of the lens 1221 in the optical axis direction by the magnetic force between the magnetic yoke structure 1270*a* and the magnets 1270.

When current is supplied to the coils 1260 included in the lens housing 1221*a* and the lens 1221 is driven in the optical axis direction, the lens housing 1221*a* including the lens 1221 can be driven to the central portion in the optical axis direction by the electromagnetic force generated between the coils 1260 and the magnets 2270 such that the lens 1221 can be returned to the central portion in the optical axis direction.

When the lens 1221 is returned to the central portion in the optical axis direction of the lens 1221, the lens 1221 may be returned to the central portion by the magnetic force of the magnets 1270 and the magnetic yoke structure 1270*a* without separately supplying current, or the lens may be returned to the central portion by the electromagnetic force of the coils 1260 and the magnets 1270 by supplying current to the coils 1260.

When the lens 1221 is driven in the optical axis direction, current may be supplied to the coils 1260 included in the AF drive unit 1232. When the current is applied to the coils 1260, the lens 1221 may be driven in the optical axis direction by the electromagnetic force generated between the coils 1260 and the magnet 1270. At this time, a focal distance between the lens unit 1221 and the image sensor 1222 included in the substrate 1223 may be adjusted automatically. The AF side position sensor unit provided at a neighboring position of the coils 1260 may detect the moving position of the lens unit 1221 in the optical axis direction. For example, the lens 1221 may precisely detect the AF driving of the camera 1220 using the AF side position detecting sensor unit.

FIG. 14A is a view illustrating the magnet 1270 and the coil 1260 among the components of the device 1200 including the camera 1220 and the acoustic component structure 1240. FIG. 14B is a view illustrating the magnet 1270 and the coil 1260 among the components of the device 1200 including the camera 1220 and the acoustic component structure 1240.

Referring to FIG. 14A, the one or more magnets 1270 may be disposed around the outer periphery of the lens housing 1221*a* including the lens 1221, and one or more coils 1260 may be disposed to face and to be spaced apart from the one or more magnets 1270 disposed on the lens housing 1221*a*. For example, the magnets 1270 may be disposed on the lens housing 1221*a*, and the coils 1260 may be disposed at positions facing the magnets 1270.

When current is applied to the coils 1260 at the time of OIS driving the lens 1221, an electromagnetic field is generated between the coils 1260 and the magnets 1270 such that the magnets 1270 can move together with the lens 1221 to correct the shaking of the lens 1221. When current is applied to the coils 1260 while the lens 1221 is driven by the AF drive unit 1232, an electromagnetic field is generated between the coils 1260 and the magnets 1270, such that the magnets 1270 can move in the optical axis direction of the lens 1221 to adjust the focus of the lens 1221.

As illustrated in FIG. 14B, one or more coils 1260 may be disposed around the outer periphery of the lens housing 1221*a* including the lens 1221, and one or more magnets 1270 may be disposed to face and to be spaced apart from the one or more coils 1260 disposed on the lens housing 1221*a*. For example, the coils 1260 may be disposed on the lens housing 1221*a* instead of the magnets 1270, and the magnets 1270 may be disposed at positions facing the coils 1260.

When current is applied to the coils 1260 disposed on the lens housing 1221*a* at the time of OIS driving the lens 1221, an electromagnetic field is generated between the coils 1260 and the magnets 1270, such that the coils 1260 can move together with the lens 1221 to correct the shaking of the lens 1221. When current is applied to the coils 1260 while the lens 1221 is AF driven, an electromagnetic field is generated between the coils 1260 and the magnets 1270 such that the coils 1260 can move in the optical axis direction of the lens 1221 to adjust the focus of the lens 1221.

FIG. 15 is a view illustrating an operating state of the AF drive unit 1232 of the camera 1220 among the components of the device 1200 including the camera 1220 and the acoustic component structure 1240.

As illustrated in FIG. 15, the AF drive unit 1232 of the camera 1220 may adjust the focus of the lens 1221 using one magnet 1270 or a plurality of magnets 1270 and one coil 1260 or a plurality of coils 1260. For example, one coil 1260 may be included in the lens 1221 and one magnet 1270 may be disposed to face and to be spaced apart from the coil 1260 to use the coil 1260 and the magnet 1270 for the function of adjusting the focus of the lens 1221. The magnets 1270 disposed to be spaced apart from the lens 1221 may face the acoustic component coil 1241 included in the acoustic component structure 1240 such that when current is applied to the acoustic component coil 1241, the magnets 1270 may be used as components for causing the diaphragm 1242 to generate sound.

For example, one coil 1260 may be included in the lens 1221 and one magnet 1270 may be provided to face the coil 1260 to adjust the focus of the lens 1221. When the remaining magnets 1270 are disposed to be spaced apart from the lens 1221 to face the acoustic component coil 1241 and current flows in the acoustic component coil 1241, a Lorentz force is generated between the acoustic component coil and the magnets such that the diaphragm can be vibrated up and down to generate sound.

Figure 16:
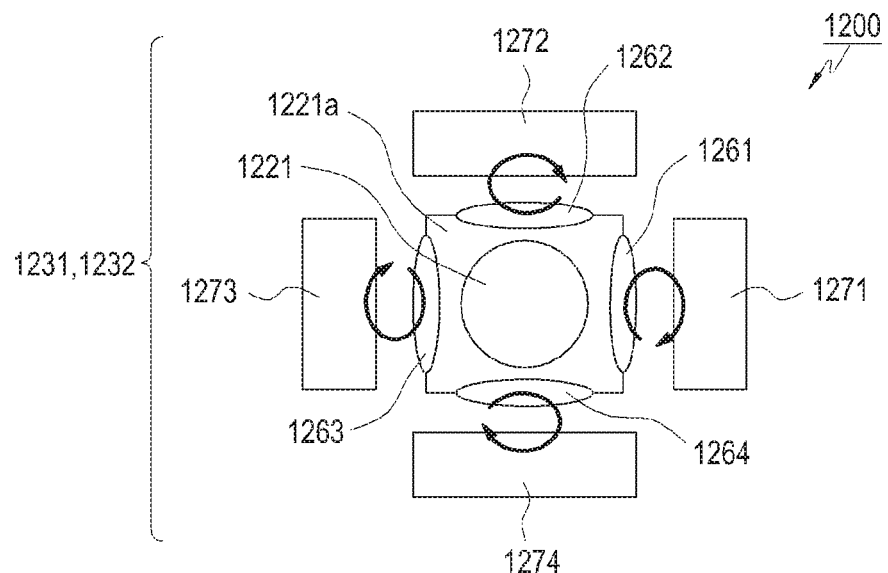
FIG. 16 is a view illustrating an operating state of an OIS drive unit and an AF drive unit of the camera among the components of the device including the camera and the acoustic component structure and included in an electronic device according to embodiments of the present disclosure.

FIG. 16 is a view illustrating an operating state of the OIS drive unit 1231 and the AF drive unit 1232 of the camera 1220 among the components of the device including the camera and the acoustic component structure and included in an electronic device according to various embodiments of the present disclosure.

As illustrated in FIG. 16, in the camera 1220, one coil 1261 may be disposed on the lens housing 1221a including the lens 1221, and one magnet 1271 may be disposed to face and to be spaced apart from the coil 1261 such that the coil 1261 and the magnet 1271 may be used as the AF drive unit 1232 to adjust the focus of the lens. In the camera 1220, the other magnets 1272, 1273, and 1274 may be disposed to face and to be spaced apart from a plurality of remaining coils 1262, 1263, and 1264 disposed on the lens housing 1221a such that the plurality of remaining coils 1262, 1263, and 1264 and the magnets 1272, 1273, and 1274 may be used as an OIS drive unit 1231 to correct the shaking of the lens 1221. For example, in the camera 1220, a first coil 1261 may be disposed on a first face of the lens housing 1221a, and a first magnet 1271 may be disposed to face and be spaced apart from the first coil 1261. Second, third, and fourth coils 1262, 1263, and 1264 may be disposed on the second, third, and fourth faces of the lens housing 1221a, and second, third, and fourth magnets 1272, 1273, and 1274 may be disposed to face the second, third, and fourth coils 1262, 1263, and 1264.

For example, the first coil 1261 and the first magnet 1271 may be used as the AF drive unit 1232 of the camera 1220, and the plurality of remaining coils and magnets disposed on the second, third, and fourth faces of the lens housing 1221a (i.e., the second, third, and fourth coils 1262, 1263, and 1264 and the second, third, and fourth magnets 1272, 1273, and 1274) may be used as the OIS drive unit 1231 of the camera 1220.

In the camera 1220, the plurality of magnets 1271, 1272, 1273, and 1274 may be disposed to face and to be spaced apart from the plurality of coils 1261, 1262, 1263, and 1264, such that the plurality of coils 1261, 1262, 1263, and 1264 and the plurality of magnets 1271, 1272, 1273, and 1274 may be used as an AF drive unit to adjust the focus of the lens 1221. For example, the first, second, third, and fourth coils 1261, 1262, 1263, and 1264 may be disposed on the first, second, third, and fourth faces of the lens housing 1221a, and the first, second, third, and fourth magnets 1271, 1272, 1273, and 1274 may be disposed to face the first, second, third, and fourth coils 1261, 1262, 1263, and 1264. The first, second, third and fourth coils 1261, 1262, 1263, and 1264 and the first, second, third, and fourth magnets 1271, 1272, 1273, and 1274 may be used as an AF drive unit 1232 of the camera 1220.

Figure 17:
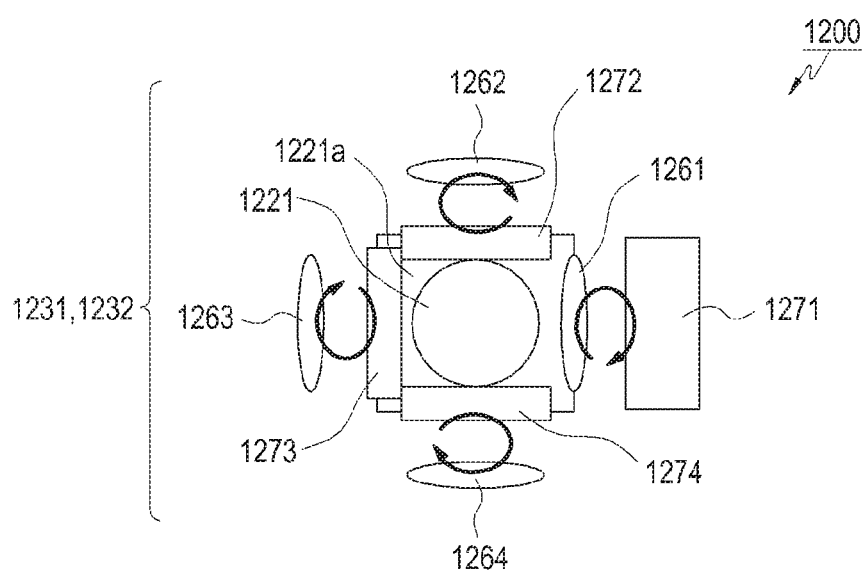
FIG. 17 is a view illustrating the OIS drive unit and the AF drive unit of the camera among the components of the device including the camera and the acoustic component structure and included in an electronic device according to embodiments of the present disclosure.

FIG. 17 is a view illustrating the OIS drive unit 1231 and the AF drive unit 1232 of the camera 1220 among the components of the device 1200 including the camera 1220 and the acoustic component structure 1240.

As illustrated in FIG. 17, in the camera 1220, one coil 1261 may be disposed on the lens housing 1221a including the lens 1221, and one magnet 1271 may be disposed to face and to be spaced apart from the coil 1261 such that the coil 1261 and the magnet 1271 may be used as the AF drive unit 1232 to adjust the focus of the lens 1221. The plurality of remaining magnets 1272, 1273, and 1274 may be disposed on the lens housing 1221a and the plurality of coils 1262, 1263, and the 1264 may be disposed to face and to be spaced apart from the magnets 1272, 1273, and 1274. The plurality of magnets 1272, 1273, and 1274, and the plurality of coils 1262, 1263, and 1264 may be used as an OIS drive unit 1231 to correct the shaking of the lens 1221.

For example, in the camera 1220, a first coil 1261 may be disposed on a first face of the lens housing 1221a, and a first magnet 1271 may be disposed to face and to be spaced apart from the first coil 1261. The second, third, and fourth coils 1262, 1263, and 1264 may be disposed on the second, third, and fourth faces of the lens housing 1221a, and second, third, and fourth magnets 1262, 1263, and 1264 may be disposed to face the second, third, and fourth coils 1262, 1263, and 1264.

For example, the first coil 1261 and the first magnet 1271 may be used as the AF drive unit 1232 of the camera 1220, and the plurality of remaining coils and magnets disposed on the second, third, and fourth faces of the lens housing 1221a (i.e., the second, third, and fourth magnets 1272, 1273, and 1274 and the second, third, and fourth coils 1262, 1263, and 1264) may be used as the OIS drive unit 1231 of the camera 1220.

In the camera 1220, the plurality of magnets 1271, 1272, 1273, and 1274 may be disposed to face and to be spaced apart from the plurality of coils 1261, 1262, 1263, and 1264, such that the plurality of coils 1261, 1262, 1263, and 1264 and the plurality of magnets 1271, 1272, 1273, and 1274 may be used as an AF drive unit to adjust the focus of the lens 1221. For example, the first, second, third, and fourth coils 1261, 1262, 1263, and 1264 may be disposed on the first, second, third, and fourth faces of the lens housing 1221a, and the first, second, third, and fourth magnets 1271, 1272, 1273, and 1274 may be disposed to face the first, second, third, and fourth coils 1261, 1262, 1263, and 1264. The first, second, third and fourth coils 1261, 1262, 1263, and 1264 and the first, second, third, and fourth magnets 1271, 1272, 1273, and 1274 may be used as an AF drive unit 1232 of the camera 1220.

Figure 18:
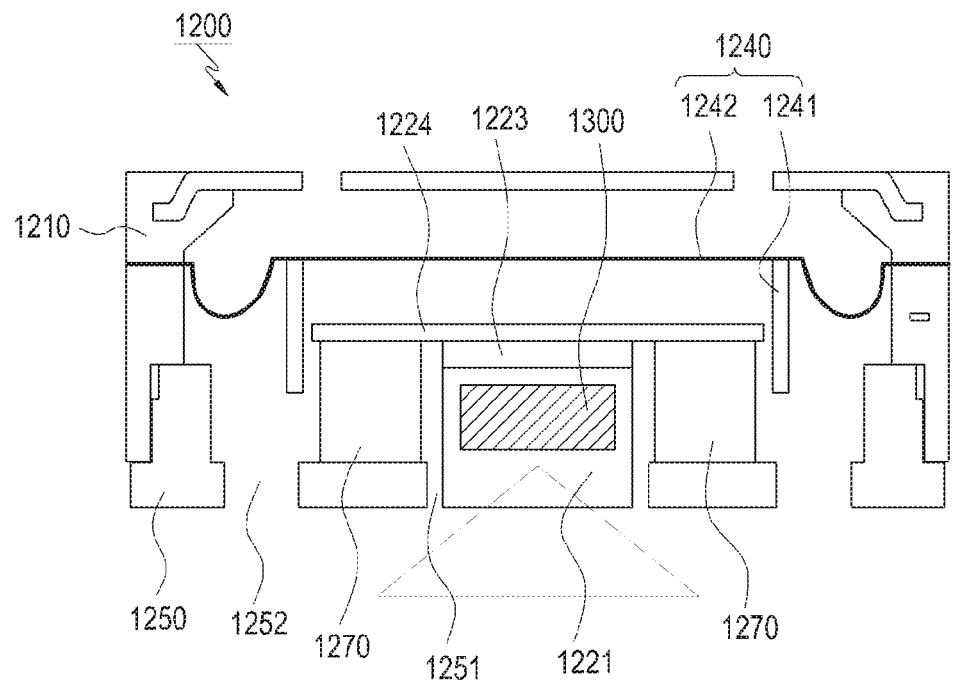
FIG. 18 is a view illustrating an operating state of the device including the camera and the acoustic component structure according to embodiments of the present disclosure.

As illustrated in FIG. 18, the camera 1220 may include an iris recognition sensor 1300. For example, when an image capture mode is executed at the time of operating the camera 1220, the lens 1221 of the camera 1220 may not only capture an image, but may also capture an image of an iris of the user when the iris recognition mode is executed, such that the iris recognition sensor 1300 can sense the image.

The iris recognition sensor 1300, once activated by a processor 120 of the electronic device 101, may perform infrared scanning of the iris of the user of the electronic device 101 using an IR LED of a light emission unit and a light reception unit of the camera 1220, and may perform iris recognition by detecting the iris of the user from the scanned image. The camera 1220 may include a substrate 1223 including an iris recognition sensor 1300 in order to perform iris recognition of the user.

Since the operations of the OIS drive unit and the AF drive unit included in the camera are the same as or similar to those illustrated in FIG. 11, a detailed description will not be repeated. Since the operation of the acoustic component structure is the same as or similar to that illustrated in FIG. 10, a detailed description will not be repeated.

The device 1200 can improve the use of the product's mounting space by integrating the camera 1220, the acoustic component structure 1240, and the iris recognition sensor 1300. Since all of the camera 1220, the acoustic component structure 1240, and the iris recognition sensor 1300 can be mounted on the central portion of the product without being eccentrically mounted, it is possible to prevent the eccentric mounting of the components, and to prevent a performance deterioration due to the eccentric mounting of the components.

Figure 19:
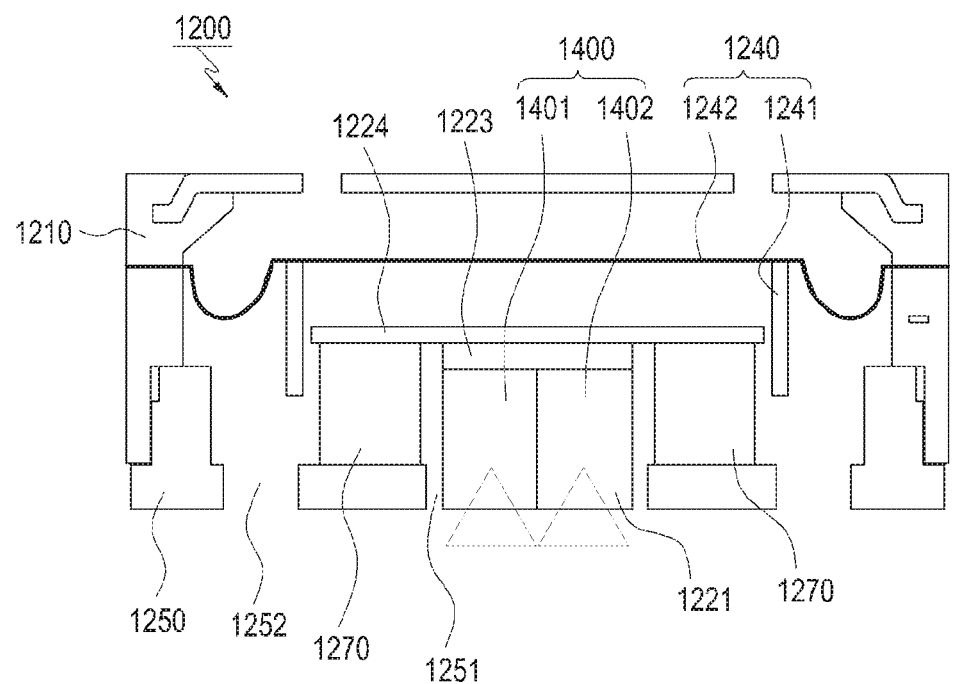
FIG. 19 is a view illustrating an operating state of the device including the camera and the acoustic component structure according to embodiments of the present disclosure.

As illustrated in FIG. 19, the camera 1220 may include a dual camera 1400. For example, when the camera 1220 is operated in the image capture mode, a first camera 1401 or a second camera 1402 of the dual camera 1400 may capture an image. The dual camera 1400 may provide an image obtained by combining images captured using the first and second lenses 1401 and 1402. The dual camera 1400 may provide various functions through a combination of a general camera, an IR camera, and the like. For example, the various functions may be performed as follows the IR camera and the general camera may perform image capture at the same time, so that an image captured by the general camera can be shown on the display of the electronic device, and the image of the IR camera may perform a captured image function. For example, it is possible to provide a user's image as a color image provided by a general camera, rather than an IR image (e.g., a monochrome image) provided by the IR camera.

The dual camera 1400 may provide functions through a combination of a wide-angle camera and a telephotographic camera.

Since the operations of the OIS drive unit and the AF drive unit included in the camera are the same as or similar to those illustrated in FIG. 11, a detailed description will not be repeated. Since the operation of the acoustic component structure is the same as or similar to that illustrated in FIG. 10, a detailed description will not be repeated.

Figure 20:
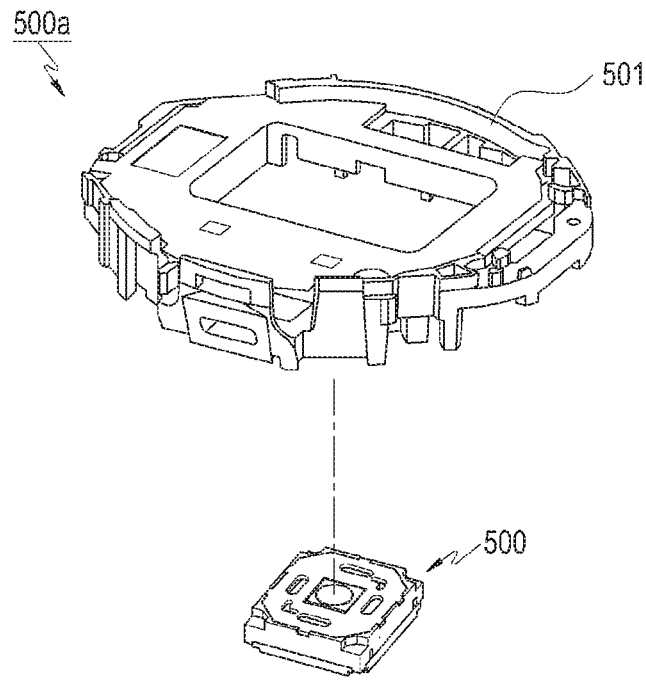
FIGS. 20 to 22 are views each illustrating the device including the camera and the acoustic component structure according to embodiments of the present disclosure in the state in which the device is applied to a wearable device.
Figure 21:
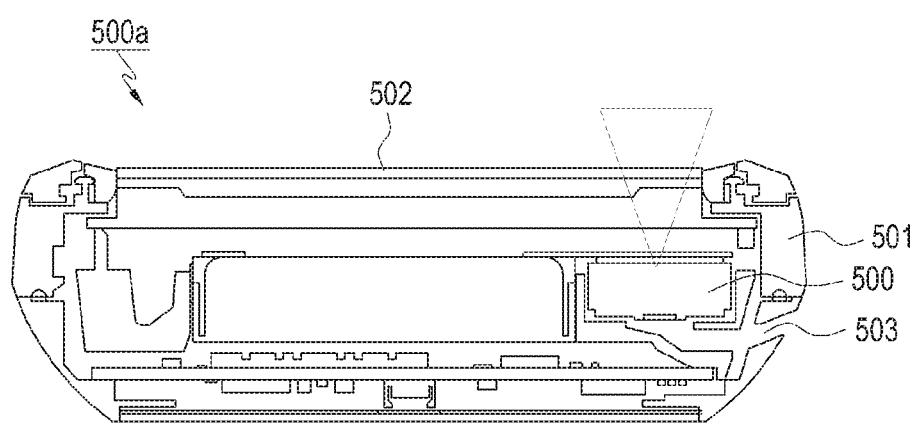
Figure 22:
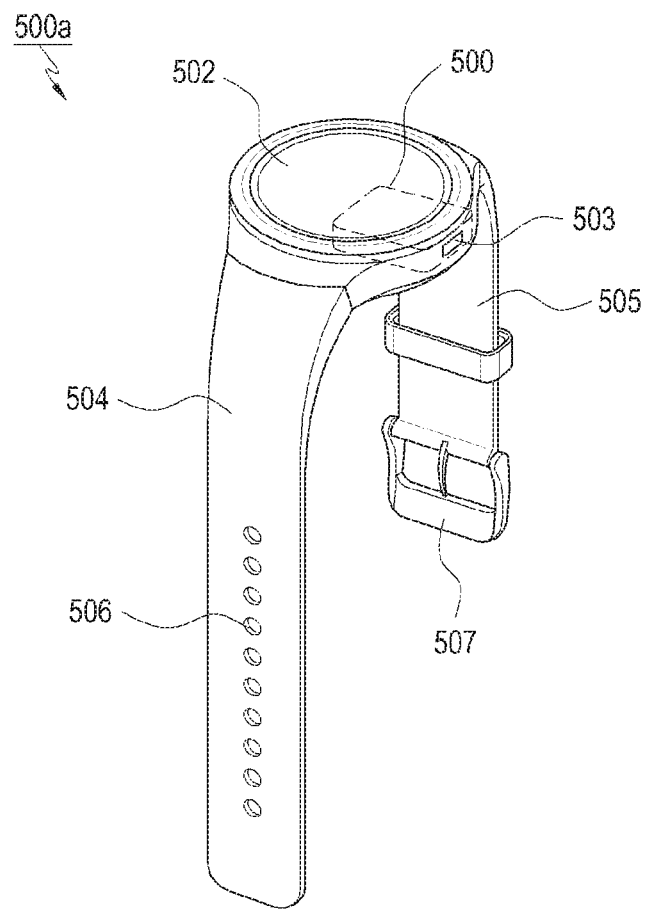

FIG. 20 is an exploded perspective view illustrating a device 500 including a camera and an acoustic component structure when the device 500a is wearable. FIG. 21 is a side cross-sectional view illustrating the device 500 including the camera and the acoustic component structure when the device 5501 is wearable. FIG. 22 is a perspective view illustrating the device 500 including the camera and the acoustic component structure when device 500a is wearable device.

Referring to FIGS. 20 to 22, the wearable device 500a may include a device housing 501, first and second straps 505 and 504, first and second buckle units 507 and 506, and a display 502.

The device housing 501 may be equipped with the device 500 in which a camera and an acoustic component structure are integrated. The camera may capture an image through the display 502 or through a camera hole formed in the display 502. The sound of the acoustic component structure may be emitted through a sound emission hole 503 formed in a side face of the device housing 501. Since the operations of the OIS drive unit and the AF drive unit included in the camera are the same as or similar to those illustrated in FIG. 11, a detailed description will not be repeated. Since the operation of the acoustic component structure is the same as or similar to that illustrated in FIG. 10, a detailed description will not be repeated.

The display 502 may be configured to be light-transmissive (e.g., transparent) to allow the camera to capture an image.

The device 500 can be mounted in a smaller installation space by integrating the camera and the acoustic component structure. For example, the device 500 can be mounted not only in the wearable device, but also in a small electronic device and a slim design electronic device.

According to various embodiments of the present disclosure, an electronic device may include a housing having a first face that faces a first direction and a second face that faces a second direction which is opposite the first face, the first face being formed to have an at least partially transparent portion and at least one opening formed adjacent to the at least partially transparent portion; a camera located within the housing and including an image sensor that faces the first direction through the at least partially transparent portion in the housing; an acoustic component structure including a space that is at least partially formed between the camera and the second face of the housing and connected to at least one opening, and at least one vibrating structure that is located in the space and is movable in the first direction or the second direction to generate sound; a circuit that is located within the housing and is electrically connected to the acoustic component structure to provide a sound associated signal to the acoustic component structure; a display exposed through the first face and positioned adjacent to the camera; and a processor located within the housing and electrically connected to the camera, the acoustic component structure, the circuit, and the display.

At least one vibrating structure may include a first vibrating structure interposed between the camera and the second face, and a second vibrating structure that encloses at least a portion of the first vibrating structure when viewed from an upper side of the first face.

The camera may include at least one lens interposed between the at least partially transparent portion and the image sensor, and at least one magnet positioned to move the lens in the first or second direction.

At least one magnet may be positioned to move at least one vibrating structure in the first direction or the second direction.

The electronic device may further include a memory electrically connected to the processor. The memory may store commands that, when executed, cause the processor to move the lens in the first direction or in the second direction while the magnet does not provide a signal to the acoustic component structure, or to move at least one vibrating structure in the first direction or the second direction while the magnet does not operate the camera.

According to embodiments of the present disclosure, a device may include a case; an acoustic component structure included in the case, and including at least one magnet, an acoustic component coil that faces at least one magnet, and a diaphragm that generates sound using at least one magnet and the acoustic component coil; a camera included in the case, and including a lens, a substrate including an image sensor, and a drive unit that drives the lens by at least one magnet or the coil; and a cover coupled to the case and forming a first opening to which the lens is coupled and at least one second opening through which sound is emitted.

The drive unit may include an Optical Image Stabilization (OIS) drive unit that corrects shake of the lens and an Auto Focus (AF) drive unit that moves the lens along an optical axis. The OIS drive unit may include a base plate; a lens housing included on the base plate and including the lens, the lens housing being disposed to be spaced apart from the image sensor; at least one coil disposed around an outer periphery of the lens housing; and at least one magnet disposed to face and to be spaced apart from at least one coil. The OIS drive unit may be configured to apply current to at least one coil to move the lens using an electromagnetic field generated between at least one coil and at least one magnet.

The AF drive unit may include a base plate; a lens housing included on the base plate and including the lens, the lens housing being disposed to be spaced apart from the image sensor; at least one coil disposed around an outer periphery of the lens housing; and at least one magnet disposed to face and to be spaced apart from at least one coil. The AF drive unit may be configured to apply current to at least one coil to move the lens in an optical axis direction using an electromagnetic field generated between at least one coil and at least one magnet.

At least one magnet may be disposed around the outer periphery of the lens housing, and at least one coil may be disposed to face and to be spaced apart from at least one magnet disposed in the lens housing.

The AF drive unit may be configured to move the lens in the optical axis direction using one or more magnets or one or more coils.

In the camera, one coil may be disposed in the lens housing and one magnet may be disposed to face and to be spaced apart from one coil such that one coil and the one magnet may be used as an AF drive unit configured to move the lens in the optical axis direction, and a plurality of remaining coils are disposed in the lens housing and a plurality of remaining magnets are disposed to face and to be spaced apart from the plurality of remaining coils such that the plurality of remaining coils and the plurality of remaining magnets may be used as an OIS drive unit configured to move the lens.

In the camera, one coil is disposed in the lens housing and one magnet is disposed to face and to be spaced apart from the one coil such that the one coil and the one magnet may be used as an AF drive unit configured to move the lens in the optical axis direction, and a plurality of remaining coils are disposed in the lens housing and a plurality of remaining magnets are disposed to face and to be spaced apart from the plurality of remaining coils such that the plurality of remaining coils and the plurality of remaining magnets may be used as an OIS drive unit configured to move the lens.

The cover may include at least one yoke or magnet that laterally faces at least one magnet and positions the lens in a central portion in the optical axis direction.

The first opening of the cover may include a lens hole that exposes the lens to outside of the electronic device 201, and the second opening of the cover may include a rear sound emission hole through which rear sound of the diaphragm is emitted.

The electronic device may be included in a wearable device, the camera of the electronic device may capture an image through a display included in the wearable device, and the acoustic component structure of the electronic device may be configured to emit sound through a sound emission hole formed in a side face of the wearable device.

At least one magnet may be included in the acoustic component structure without being included in the camera, the magnet may be used in common to operate the acoustic component structure and to operate the camera. At least one magnet may be included in the camera without being included in the acoustic component structure, and the magnet component may be used in common to operate the acoustic component structure and to operate the camera.

Figure 23:
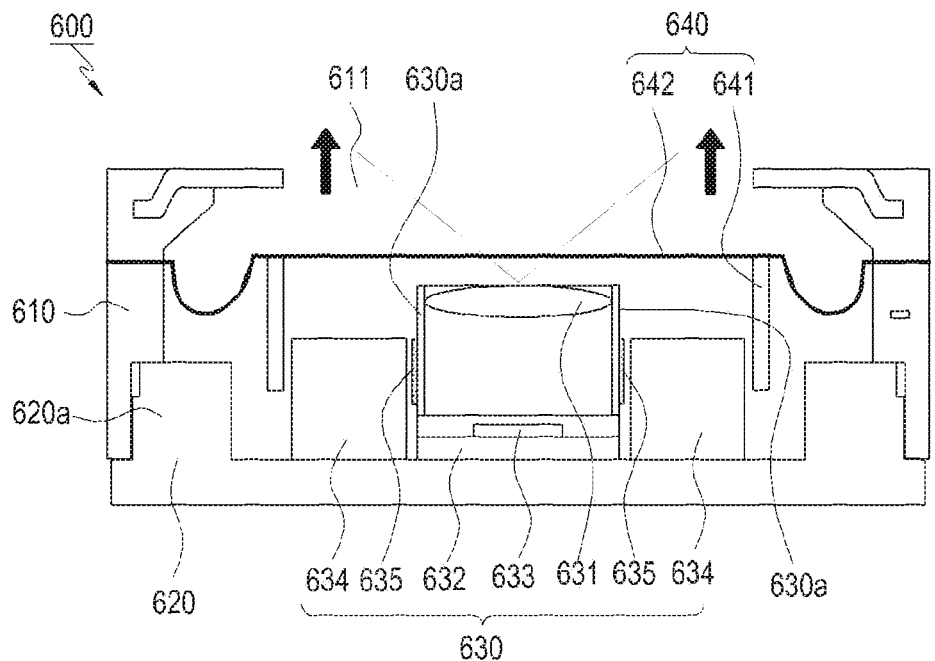
FIG. 23 is a view illustrating a configuration of the device including the camera and the acoustic component structure according to embodiments of the present disclosure.

FIG. 23 is a view illustrating a structure of a device 600 including a camera 630 and an acoustic component structure 640.

re) of the cellular module 221, the WiFi module 223, the Bluetooth module 225, coustic component structure 640, and a cover 620.

The case 610 may include the acoustic component structure 640, and the cover 620 including the camera 630 may be integrated by being coupled to the upper portion of the case 610.

The camera 630 may be included in the cover 620. The camera 630 may include a lens housing 630a including a lens 631, a substrate 632 including an image sensor 633, one or more magnets 634 and one or more coils 635 included in the acoustic component structure 640, and a drive unit that drives the lens housing 630a including the lens 631 by the magnets 634 and one or more coils 635. For example, when current is applied to the coils 635 attached around the side face of the lens housing 630a, an electromagnetic field is generated between the coils 635 and the magnets such that the coils 635 can move together with the lens housing 630a and the lens housing can move together with the lens.

The acoustic component structure 640 may be included in front of the camera 630. The acoustic component structure 640 may include an acoustic component coil 641 disposed to face one or more magnets 634, or a diaphragm 642 that generates sound together with the magnets 643 and the acoustic component coil 641.

The cover 620 may include the camera 630. The cover 620 may be coupled to the case 610.

The case 610 may include an opening 611. The opening 611 may enable the image capturing of the camera 630 or 631, and the sound emission of the diaphragm 642. For example, the diaphragm 642 may be disposed in front of the lens 631 of the camera 630, and the diaphragm 642 may include a transparent material in order to allow the camera 630 to capture an image through the transparent material. For example, the camera 630 may be capable of capturing an image which is transmitted through the diaphragm 642 made of the transparent material.

The drive unit of the camera 630 may include an OIS drive unit and an AF drive unit. The OIS drive unit may correct the shaking of the lens housing 630a including the lens 631. The AF drive unit may move the lens housing 630a including the lens 631 along the optical axis of the lens 631 to adjust the focus. Since the operations of the OIS drive unit and the AF drive unit are the same as or similar to those illustrated in FIG. 11, a detailed description will not be repeated. Since the operation of the acoustic component structure 640 is the same as or similar to that illustrated in FIG. 10, a detailed description will not be repeated.

When the acoustic component structure 640 is operated, current can flow through the acoustic component coil 641 causing the diaphragm 642 can be vibrated using shared magnets 634, thereby generating sound, and the camera 640 can also correct the shaking of the lens 631, or adjust the focus of the lens 631 using the shared magnets 634.

The acoustic component structure 640 and the camera 630 may emit sound and the camera 630 may capture an image, through a single opening in the case. The acoustic component structure 640 and the camera 630 may be integrally included together in the case 610 and the cover 620, thereby being integrated. Since the camera 630 and the acoustic component structure 640 are configured to be able to driven by the magnets 634 included in the acoustic component structure 640, it is possible to reduce the number of the magnets 634 that are included in each of the existing camera 630 and acoustic component structure 640. Since the camera 630 is configured to be able be driven by the magnets 634 included in the acoustic component structure 640 instead of the magnets of the camera, it is possible to reduce the number of magnets that are included in an existing camera. In addition, since the acoustic component structure is configured to be able to be driven by the magnets included in the camera, it is possible to reduce the number of magnets 634 that are included in the acoustic component structure 640.

According to embodiments of the present disclosure, a device includes a case including an opening; a cover coupled to the case; an acoustic component structure included in the case, and including at least one magnet, an acoustic component coil that faces at least one magnet, and a diaphragm that generates sound using at least one magnet and the acoustic component coil; and a camera included in the case, and including a lens, a substrate including an image sensor, and a drive unit that drives the lens by at least one magnet and the coil. The opening may enable the image capturing of the camera 630 and the sound emission of the diaphragm.

Figure 24:
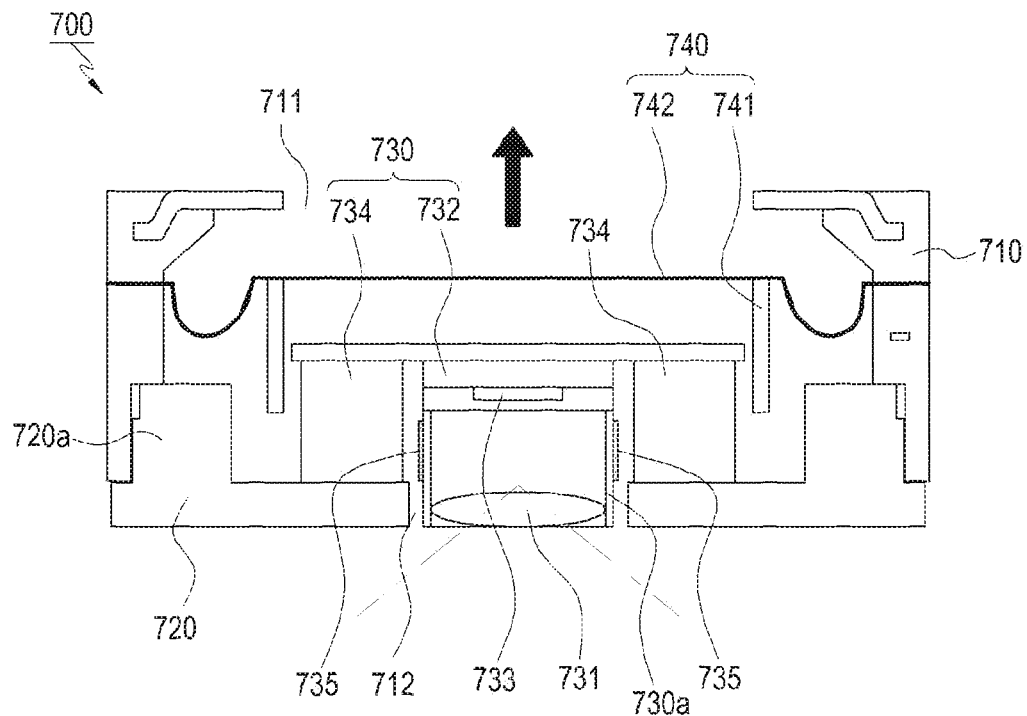
FIGS. 24 to 26 are views each illustrating the camera and the acoustic component structure which are included in an electronic device according to embodiments of the present disclosure.
Figure 25:
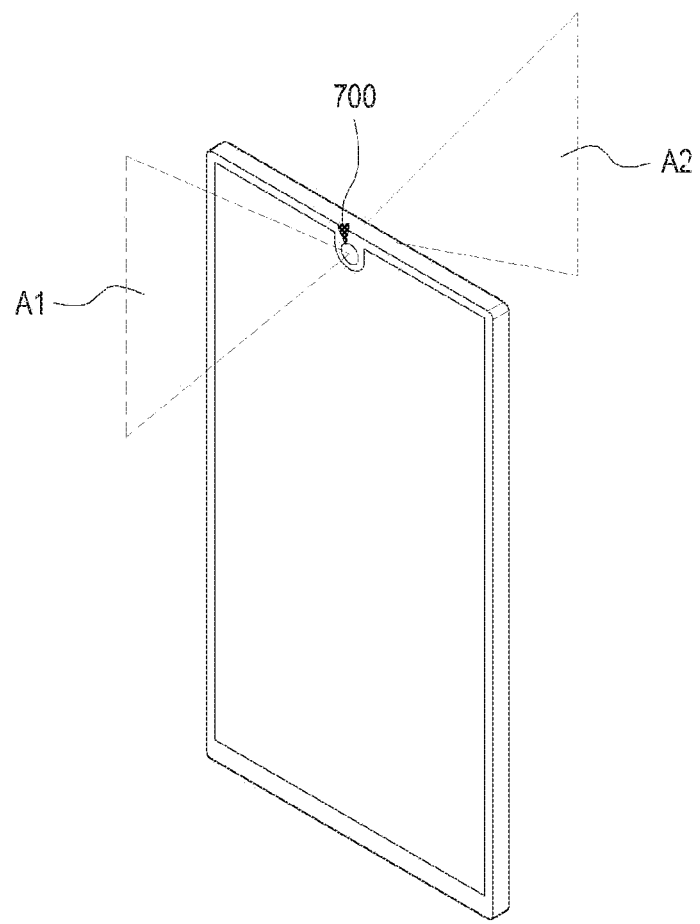
Figure 26:
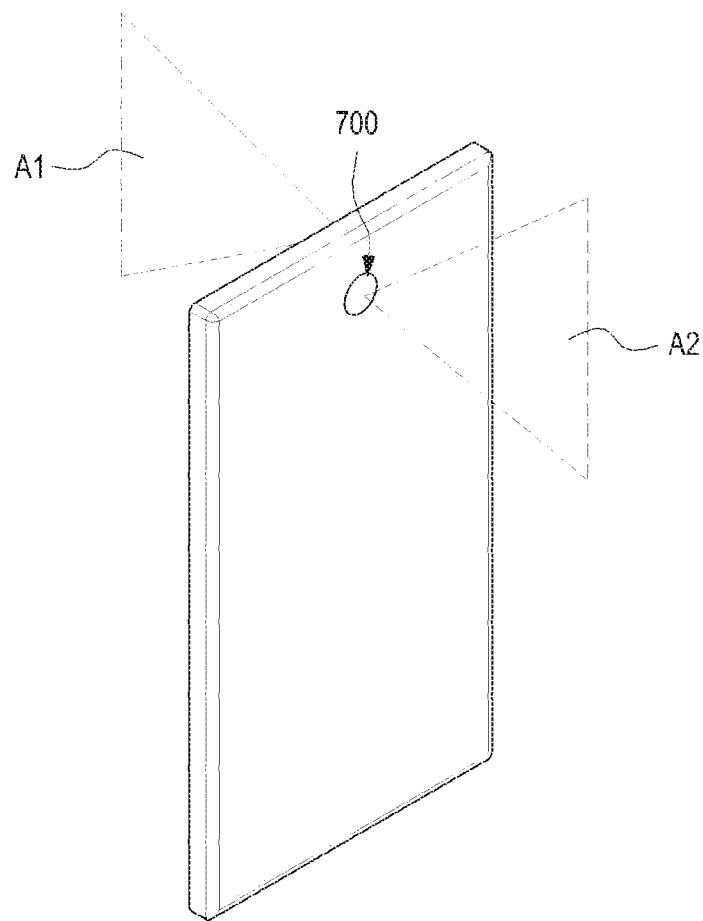

FIG. 24 is a side cross-sectional view illustrating an operating state of a device 700 including a camera 730 and an acoustic component structure 740. FIG. 25 is a perspective view illustrating, from the rear side, the operating state of the device 700 including the camera 730 and the acoustic component structure 740. FIG. 26 is a view illustrating, from the front side, the operating state of the device 700 including a camera 730 and an acoustic component structure 740.

Referring to FIG. 24, the device 700 may include a case 710 including a first opening 711, a camera 730, an acoustic component structure 740, and a cover 720 including a second opening 712.

The case 710 may include the camera 730 and the acoustic component structure 740, and may be integrated by being coupled to the cover 720.

The camera 730 may be included in the case 710. The camera 730 may include a lens 731; a substrate 732 including an image sensor 733; and one or more magnets 734 and one or more coils 735, which are included in the acoustic component structure 740, or a drive unit configured to drive the lens 731 by the magnets 734 and the coils 735. The coils 735 may be disposed around the outer periphery of the lens housing 730a of the camera 730. A yoke 720a facing the magnet may be disposed in the cover 710.

The acoustic component structure 740 may be included behind the camera 730. The acoustic component structure 740 may include one or more magnets 734, an acoustic component coil 741 that faces one or more magnets 734, or an acoustic component coil 741 that faces the magnets 734, and a diaphragm 742 that generates sound with the one or more magnets 734 and the acoustic component coil 741.

As illustrated in FIG. 25, a first opening 711 (see FIG. 24) may be formed in the front face of the case 710 (see FIG. 24). Through the first opening 711 (see FIG. 24), the sound emission A1 of the diaphragm 742 (see FIG. 24) can be routed to the front face of the case 710. The first opening 711 may include a front sound emission hole.

As illustrated in FIG. 26, the second opening 712 (see FIG. 24) may be formed in the rear face of the case 710 (see FIG. 24). The lens 731 (see FIG. 24) of the camera 730 may be coupled through the second opening 712 (see FIG. 24) such that the rear image capturing A2 of the device 700 can be performed through the camera 730. The second opening 712 (see FIG. 24) may include a lens hole.

For example, as illustrated in FIGS. 25 and 26, for the sound of the diaphragm 742, the sound emission A1 may be routed to the front of the electronic device 700 through the first opening 711 formed in the front face of the case 710. The camera 730 can capture an image (e.g., image capturing A2) to the rear face of the electronic device 700 through the second opening 712 formed in the rear face of the case 710.

By forming the first and second openings in the front and rear faces of the case 710 of the device 700, the sound emission A1 of the acoustic component structure 740 may be performed through the first opening 711, and image capturing A2 of the camera 730 may be performed through the second opening 712.

The drive unit of the camera 730 may include an OIS drive unit and an AF drive unit. The OIS drive unit is capable of correcting the shaking state of the lens 731. The AF drive unit is capable of adjusting the focus of the lens 731 by moving the lens 731 along the optical axis of the lens 731. Since the operations of the OIS drive unit and the AF drive unit are the same as or similar to those illustrated in FIG. 11, a detailed description will not be repeated. Since the operation of the acoustic component structure 740 is the same as or similar to that illustrated in FIG. 10, a detailed description will not be repeated.

When the acoustic component structure 740 is operated, current can flow through the acoustic component coil 741 such that the diaphragm 742 can be vibrated using the shared magnets 734, thereby performing the sound emission A1 through the first opening 711 formed in the front face of the case 710, and the camera 730 can also correct the shaking of the lens 731 or adjust the focus of the lens 731 using the shared magnets 734.

The acoustic component structure 740 and the camera 730 can perform the sound emission A1 and the image capturing A2 through the first and second openings 711 and 712 formed in the front and rear faces of the case. The acoustic component structure 740 and the camera 730 may be integrated together in the case 710 and the cover 720. The camera 730 and the acoustic component structure 740 may be configured to be able to be driven using the magnets 734 included in the camera 730 or the acoustic component structure 740. For example, by configuring the camera 730 to be driven by the magnets included in the acoustic component structure 740 instead of the magnets of the camera, the number of magnets that are included in an existing camera, can be reduced, which can reduce the number of components of the product.

Figure 27:
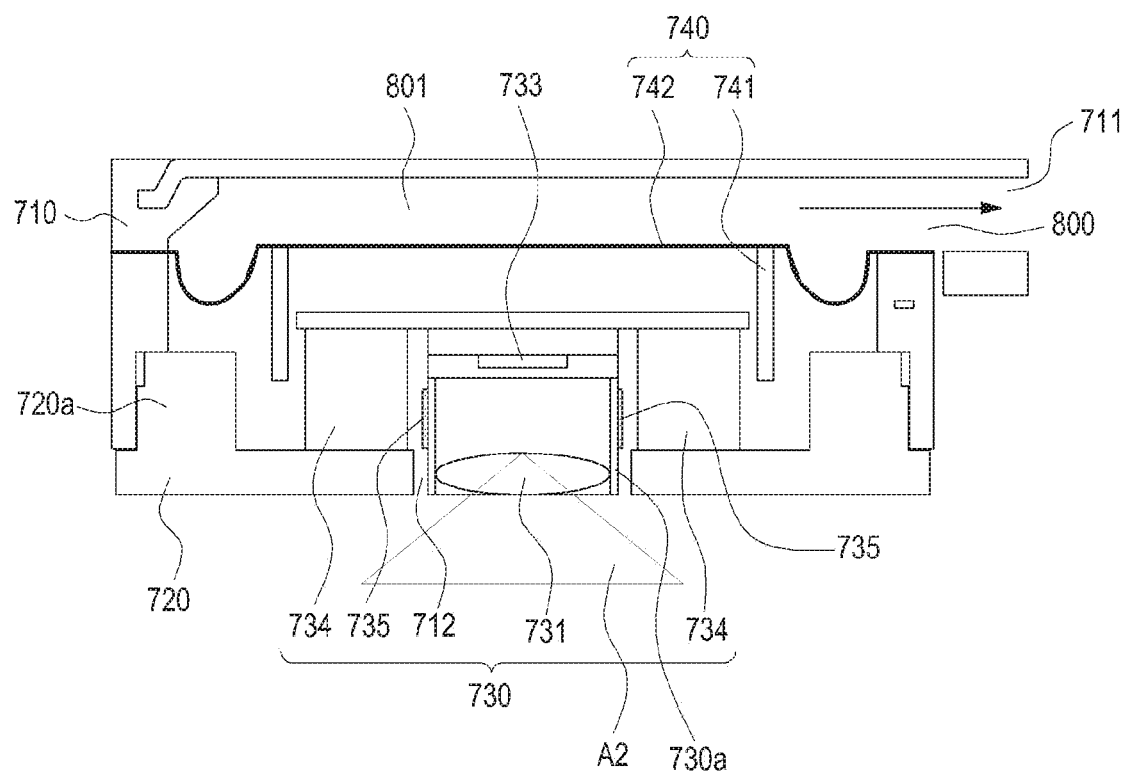
FIG. 27 is a view illustrating a configuration of the device including the camera and the acoustic component structure according to embodiments of the present disclosure.

As illustrated in FIG. 27, the first opening 711 may be formed in a side face of the case 710, and may include a sound emission hole 800 to emit the sound of the diaphragm 742 to the side face.

The acoustic component structure 740 may include an emission passage 801 through which sound is emitted between the case 710 and the diaphragm 742 to form the side emission hole 800 in the side face. For example, the acoustic component structure 740 may form the sound emission direction of the diaphragm 742 with a 90 degree bend, and the sound may move along the emission passage 801 to be emitted through the side emission hole 800.

According to embodiments of the present disclosure, a device may include a case including an opening; a cover coupled to the case and including a second opening; an acoustic component structure included in the case, and including at least one magnet, an acoustic component coil that faces at least one magnet, and a diaphragm that generates sound using at least one magnet and the acoustic component coil; and a camera included in the case, and including a lens, a substrate including an image sensor, and a drive unit that drives the lens by at least one magnet and the coil.

The first opening may be formed in the front face of the case and may emit sound of the diaphragm to the front face of the case, and the second opening may be formed in the rear face of the case such that the lens may be coupled through the second opening.

The first opening may include a front sound emission hole through which sound is emitted to the front face of the diaphragm, and the second opening may include a lens hole that allows the lens to pass through.

The first opening may be formed in a side face of the case, and may include a side emission hole configured to emit the sound of the diaphragm to the side face.

Figure 28:
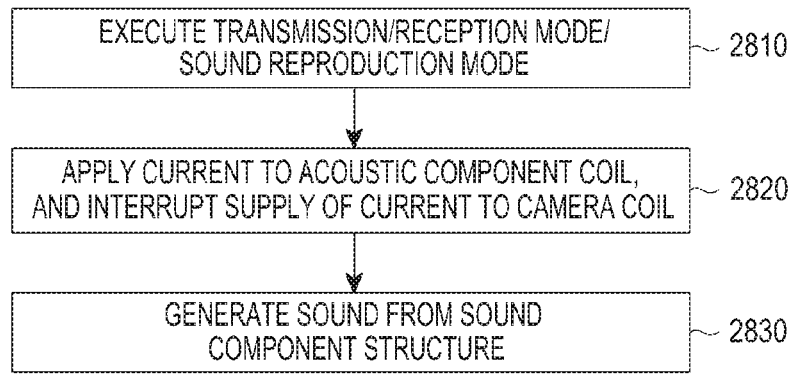
FIG. 28 is a flowchart illustrating an operating method of the acoustic component structure among the components of the device including the camera and the acoustic component structure according to embodiments of the present disclosure.

FIG. 28 is a flow chart illustrating a method of operating an acoustic component structure 1240 included in a device 1200.

The operations of the acoustic component structure 1240 will be described with reference to FIG. 28. In step 2810, the electronic device 101 may execute the acoustic component structure 1240 in a transmission/reception mode and a sound reproduction mode. In step 2820, the processor 120 of the electronic device 101 may apply current only to the acoustical component coil 1241, and may interrupt the supply of current to the coil 1260 of the camera 1220. In step 2830, when the current flows only to the acoustic component coil 1241 that faces and is spaced apart from the one or more magnets 1270 of the acoustic component structure 1240, a Lorentz force is generated, and sound can be generated by moving the diaphragm 1242 up and down by the Lorentz force.

According to embodiments of the present disclosure, a method of operating an acoustic component structure of a device may include an operation in which, when an operation is executed with the acoustic component structure, a transmission/reception mode and a sound reproduction mode of the device are executed; an operation in which a processor included in the electronic device interrupts the supply of current to a coil included in a camera, and applies current to an acoustic component coil of the acoustic component structure; and an operation in which a force is generated by the acoustic component coil and at least one magnet of the acoustic component structure, and a diaphragm is vibrated up and down to generate sound.

Figure 29:
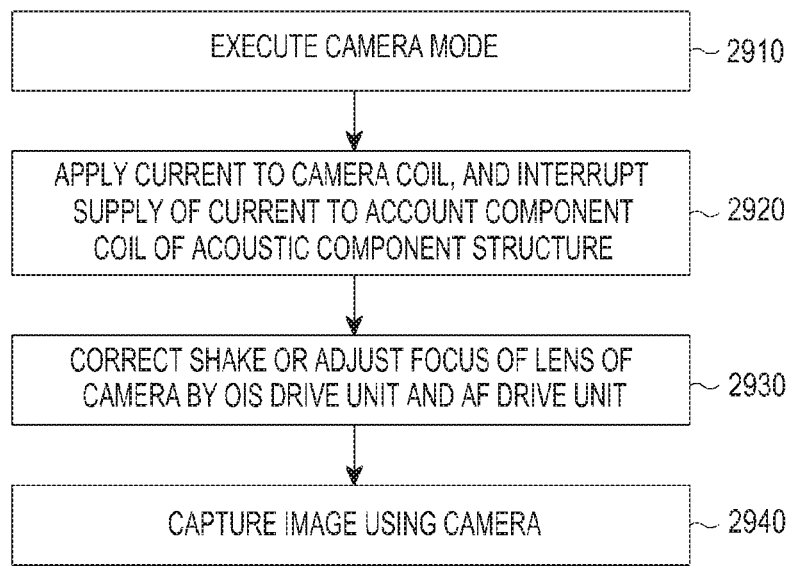
FIG. 29 is a flowchart illustrating an operating method of the camera among the components of the device including the camera and the acoustic component structure according to embodiments of the present disclosure.

FIG. 29 is a flow chart illustrating a method of operating a camera 1220 included in a device 1200.

The operation of the camera 1220 will be described with reference to FIG. 29. In step 2910, the electronic device 101 may be executed in a camera 1220 mode. In step 2920, the processor 120 of the electronic device 101 may apply current only to the acoustical component coil 1260 of the camera 1220, and may interrupt the supply of current to the acoustic component coil 1241. In step 2930, the processor 120 of the electronic device 101 may control the OIS drive unit to move the lens to correct the shaking of the lens. The processor of the electronic device 101 may adjust the focus of the lens by moving the lens by controlling the AF drive unit. In step 2940, an image may be captured using the camera 1220.

For example, the acoustic component structure 1240 may include a receiver or a speaker. When the electronic device 101 is used in a transmission/reception mode, the acoustic component structure 1200 may be used not only as a receiver, but also as a speaker.

Since the camera is operated using a magnet of the acoustic component structure at the time of operating the acoustic component structure and the camera, it is possible to operate the camera by commonly using the magnet of the acoustic component structure and to prevent magnetic interference, which may occur between the acoustic component structure and the camera, by sharing the magnet of the acoustic component structure with the camera. For example, when a magnet is included in the acoustic component structure, it is possible to share the magnet to operate the acoustic component structure and the camera. Further, when the magnet is included in the camera, it is possible to operate the acoustic component structure and the camera using the magnet of the camera.

According to embodiments of the present disclosure, a method of operating an acoustic component structure of an electronic device may include an operation in which, when an operation is executed with the acoustic component structure, a transmission/reception mode and a sound reproduction mode of the electronic device are executed; an operation in which a processor included in the electronic device interrupts the supply of current to a coil included in a camera, and applies current to an acoustic component coil of the acoustic component structure; and an operation in which a force is generated by the acoustic component coil and at least one magnet, and a diaphragm is vibrated up and down to generate sound.

According to embodiments of the present disclosure, a method of operating a camera of an electronic device may include an operation in which, when an operation is executed with the camera, the operation is executed in a camera mode of the electronic device; an operation in which a processor included in the electronic device interrupts the supply of current to an acoustic component coil included in an acoustic component structure and applies current to at least one coil of the camera; an operation in which an electromagnetic field is generated by at least one coil and at least one magnet, and an OIS drive unit and an AF drive unit using the electromagnetic field to correct shake of the camera or adjust a focus of the lens; and an operation in which an image is captured using the camera.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing having a first face that faces a first direction and a second face that faces a second direction which is opposite the first face, the first face being formed to have an at least partially transparent portion and at least one opening formed adjacent to the at least partially transparent portion;
a camera located within the housing and including at least two magnets, at least one lens, and an image sensor that faces the first direction through the at least partially transparent portion in the housing, the at least two magnets being positioned to move the lens in one of the first direction and the second direction;
an acoustic component structure including at least one space that is at least partially formed between the camera and the second face of the housing and connected to the at least one opening, and at least one vibrating structure located in the at least one space and movable, by the at least two magnets, in one of the first direction and the second direction to generate sound;
a circuit located within the housing and electrically connected to the acoustic component structure to provide a sound associated signal to the acoustic component structure; and
a processor located within the housing and electrically connected to the camera, the acoustic component structure, and the circuit.

2. The electronic device of claim 1, wherein the at least one vibrating structure includes a first vibrating structure interposed between the camera and the second face, and a second vibrating structure that encloses at least a portion of the first vibrating structure when viewed from an upper side of the first face.

3. The electronic device of claim 1, wherein the at least one lens is interposed between the at least partially transparent portion and the image sensor.

4. The electronic device of claim 1, further comprising a memory electrically connected to the processor,
wherein the memory stores commands that, when executed, cause the processor to move one of the lens in one of the first direction and the second direction while the at least two magnets do not provide a signal to the acoustic component structure, and to move the at least one vibrating structure in one of the first direction and the second direction while the at least two magnets do not operate the camera.

5. A device comprising:
a case;
an acoustic component structure included in the case, and including at least two magnets, an acoustic component coil that faces the at least two magnets, and a diaphragm that generates sound using the at least two magnets and the acoustic component coil;
a camera included in the case, and including a lens, a substrate including an image sensor, and a drive unit that drives the lens by one of the at least two magnets and the acoustic component coil; and
a cover coupled to the case and forming a first opening to which the lens is coupled and at least one second opening through which sound is emitted.

6. The device of claim 5, wherein the drive unit includes an optical image stabilization (OIS) drive unit that corrects shake of the lens and an auto focus (AF) drive unit that moves the lens along an optical axis.

7. The device of claim 6, wherein the OIS drive unit includes:
a base plate;
a lens housing included on the base plate and including the lens, the lens housing being disposed to be spaced apart from the image sensor;
at least two coils disposed around an outer periphery of the lens housing; and
the at least two magnets disposed to face and to be spaced apart from the at least two coils,
wherein the OIS drive unit is configured to apply current to the at least two coils to move the lens using an electromagnetic field generated between the at least two coils and the at least two magnets.

8. The device of claim 7, wherein the AF drive unit includes:
a base plate;
a lens housing included on the base plate and including the lens, the lens housing being disposed to be spaced apart from the image sensor;
the at least two coils disposed around an outer periphery of the lens housing; and
the at least two magnets disposed to face and to be spaced apart from the at least two coils,
wherein the AF drive unit is configured to apply current to the at least two coils to move the lens in an optical axis direction using an electromagnetic field generated between the at least two coils and the at least two magnets.

9. The device of claim 8, wherein the at least two magnets are disposed around the outer periphery of the lens housing, and
the at least two coils are disposed to face and to be spaced apart from the at least two magnets disposed around the lens housing.

10. The device of claim 8, wherein the AF drive unit is configured to move the lens in the optical axis direction using the at least two magnets and the at least two coils.

11. The device of claim 8, wherein, in the camera, one coil of the at least two coils is disposed in the lens housing and one magnet of the at least two magnets are disposed to face and to be spaced apart from the one coil such that the one coil and the one magnet are used as an AF drive unit configured to move the lens in the optical axis direction, and a plurality of remaining coils of the at least two coils are disposed in the lens housing and a plurality of remaining magnets of the at least two magnets are disposed to face and to be spaced apart from the plurality of remaining coils such that the plurality of remaining coils and the plurality of remaining magnets are used as an OIS drive unit configured to move the lens.

12. The device of claim 8, wherein, in the camera, one coil of the at least two coils is disposed in the lens housing and one magnet of the at least two magnets is disposed to face and to be spaced apart from the one coil such that the one coil and the one magnet are used as an AF drive unit configured to move the lens in the optical axis direction, and a plurality of remaining magnets of the at least two magnets are disposed in the lens housing and a plurality of remaining magnets are disposed to face and to be spaced apart from the plurality of remaining coils of the at least two coils such that the plurality of remaining coils and the plurality of remaining magnets are used as an OIS drive unit configured to move the lens.

13. The device of claim 8, wherein the cover includes at least one yoke or magnet that laterally faces the at least two magnets and positions the lens in a central portion in the optical axis direction.

14. The device of claim 5, wherein the first opening of the cover includes a lens hole that exposes the lens to outside of the electronic device, and the second opening of the cover includes a rear sound emission hole through which rear sound of the diaphragm is emitted.

15. The device of claim 5, wherein the camera includes an iris recognition sensor.

16. The device of claim 5, wherein the camera includes a dual camera.

17. The device of claim 5, wherein the device is included in a wearable device, the camera of the device captures an image through a display included in the wearable device, and the acoustic component structure of the device is configured to emit sound through a sound emission hole formed in a side face of the wearable device.

18. The device of claim 5, wherein the at least two magnets are included in the acoustic component structure without being included in the camera, the at least two magnets are used in common to operate the acoustic component structure and to operate the camera, and the at least two magnets are included in the camera without being included in the acoustic component structure, and the at least two magnets are commonly used to operate the acoustic component structure and to operate the camera.

19. A device comprising:
a case including an opening;
a cover coupled to the case;
an acoustic component structure included in the case, and including at least two magnets, an acoustic component coil that faces the at least two magnets, and a diaphragm that generates sound using the at least two magnets and the acoustic component coil; and
a camera included in the case, and including a lens, a substrate including an image sensor, and a drive unit that drives the lens by the at least two magnets and the acoustic component coil,
wherein the opening enables image capturing of the camera and sound emission of the diaphragm.

20. The device of claim 19, wherein the diaphragm includes a transparent material.

21. A device comprising:
a case including a first opening;
a cover coupled to the case and including a second opening;
an acoustic component structure included in the case, and including at least two magnets, an acoustic component coil that faces the at least two magnets, and a diaphragm with a front face that generates sound using the at least two magnets and the acoustic component coil; and
a camera included in the case, and including a lens, a substrate including an image sensor, and a drive unit that drives the lens by the at least two magnets and the acoustic component coil,
wherein the first opening is formed in a front face of the case and emits sound of the diaphragm to the front face of the case, and
the second opening is formed in a rear face of the case, and the lens is coupled through the second opening.

22. The device of claim 21, wherein the first opening includes a front sound emission hole through which sound is emitted to a front face of the diaphragm, and
the second opening includes a lens hole that allows the lens to pass therethrough.

23. The device of claim 21, wherein the first opening is formed in a side face of the case, and includes a side emission hole configured to emit the sound of the diaphragm to the side face.

24. A method of operating an acoustic component structure of an electronic device, the method comprising:
when an operation is executed with the acoustic component structure, execution one of a transmission/reception mode, and a sound reproduction mode of the device;
interrupting, by a processor included in the device, supply of current to a coil included in a camera, and applying current to an acoustic component coil of the acoustic component structure; and
generating a force by at least one of the acoustic component coil and at least two magnets of the acoustic component structure, and vibrating a diaphragm up and down to generate sound.

25. A method of operating a camera of a device, the method comprising:
executing a camera mode in the device;
interrupting, by a processor included in the device, supply of current to an acoustic component coil included in an acoustic component structure and applying current to at least two coils of the camera;
generating an electromagnetic field, by the at least two coils and at least two magnets included in the acoustic component structure, by using the electromagnetic field an OIS drive unit and an AF drive unit, to perform at least one of correcting shake of the camera and adjusting a focus of the lens; and
capturing an image using the camera.

* * * * *